(12) United States Patent
Slotta

(10) Patent No.: US 6,724,369 B2
(45) Date of Patent: *Apr. 20, 2004

(54) TEXTURED CUSHION FOR KEYBOARD CURSOR CONTROL STICK

(75) Inventor: Mark R. Slotta, Highland, MI (US)

(73) Assignee: GIV, LLC, Highland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/194,715

(22) Filed: Jul. 12, 2002

(65) Prior Publication Data

US 2004/0056841 A1 Mar. 25, 2004

Related U.S. Application Data

(60) Continuation-in-part of application No. 09/703,041, filed on Oct. 31, 2000, which is a continuation-in-part of application No. 09/281,126, filed on Mar. 29, 1999, now Pat. No. 6,140,998, which is a division of application No. 08/717,220, filed on Sep. 26, 1996, now Pat. No. 5,889,508.

(51) Int. Cl.[7] ................................................. G09G 5/08
(52) U.S. Cl. ....................... 345/161; 345/157; 345/158; 345/156; 345/160; 345/163
(58) Field of Search ................................. 345/157, 158, 345/156, 160, 161, 163

(56) References Cited

U.S. PATENT DOCUMENTS

| | | | |
|---|---|---|---|
| 3,898,397 A | | 8/1975 | Devore et al. |
| 4,565,460 A | * | 1/1986 | Kline .......................... 400/490 |
| 4,896,003 A | * | 1/1990 | Hsieh .......................... 200/6 A |
| 5,087,904 A | | 2/1992 | DeVolpi |
| 5,134,008 A | | 7/1992 | Alm |
| 5,290,115 A | * | 3/1994 | Little .......................... 400/491 |
| 5,407,285 A | | 4/1995 | Franz |
| 5,488,206 A | * | 1/1996 | Wu .............................. 200/6 A |
| 5,504,502 A | | 4/1996 | Arita et al. |
| 5,568,987 A | | 10/1996 | Franz |
| 5,570,112 A | | 10/1996 | Robinson |
| 5,670,988 A | | 9/1997 | Tickle |
| 5,691,747 A | * | 11/1997 | Amano ........................ 345/167 |
| 5,694,123 A | | 12/1997 | Selker et al. |
| 5,701,142 A | | 12/1997 | Brown et al. |
| 5,705,778 A | * | 1/1998 | Matsui et al. .............. 200/11 R |
| 5,708,562 A | | 1/1998 | Agata et al. |
| 5,712,660 A | | 1/1998 | Martin |
| 5,754,166 A | * | 5/1998 | Baba ........................... 345/157 |
| 5,798,754 A | * | 8/1998 | Selker et al. ................ 345/161 |

(List continued on next page.)

OTHER PUBLICATIONS

IBM ThinkPad 750 and 750C User's Manual pp. 4–27 through 4–29, dated prior to invention.

Santoprene Thermoplastic Rubber. Datasheet. [online]. Advanced Elastomer Systems, L.P. [retrieved on Oct. 30, 2000]. Retrieved from the Internet <URL:www.santoprene.com/aes/santoprene.html>.

(List continued on next page.)

Primary Examiner—Regina Liang
Assistant Examiner—Jennifer T. Nguyen
(74) Attorney, Agent, or Firm—MacMillan, Sobanski & Todd, LLC

(57) ABSTRACT

A gel cushion that can be attached to an existing cursor pointing device (control stick) on a computer or keyboard, or be integrally formed with the cap during manufacture. The gel cushion is flexible enough to prevent tissue damage to the user's fingers due to repetitive motions over an extended period of use, yet firm enough to transmit the desired pressure to the control stick. The gel cushion designed to be used on an existing control stick can be applied with an adhesive to a cap, or with a frictional fit directly to the control stick. The gel cushion is designed to be easily installed and replaced when worn.

103 Claims, 14 Drawing Sheets

U.S. PATENT DOCUMENTS

| | | | |
|---|---|---|---|
| 5,870,082 A | 2/1999 | Selker et al. | |
| 5,889,507 A | 3/1999 | Engle et al. | |
| 5,889,508 A | 3/1999 | Slotta | |
| 6,019,534 A | 2/2000 | Heins | |
| 6,040,758 A | 3/2000 | Sedor et al. | |
| 6,057,540 A | 5/2000 | Gordon et al. | |
| 6,135,476 A | 10/2000 | Dickie et al. | |
| 6,140,998 A * | 10/2000 | Slotta | 345/161 |
| 6,239,786 B1 | 5/2001 | Burry et al. | |
| 6,271,834 B1 | 8/2001 | May et al. | |
| 6,353,431 B1 | 3/2002 | Poole et al. | |
| 6,390,423 B1 | 5/2002 | Danzyger et al. | |
| 6,400,354 B1 | 6/2002 | Pin-Chien | |

OTHER PUBLICATIONS

TPE Applications for Broad Industry Needs. Information sheet [online]. Advanced Elastomer Systems, L.P. [retrieved on Oct. 30, 2000]. Retrieved from the Internet <URL: www.santoprene.com/aes/applications.html>.

IBM ThinkPad R40. CNET Reviews, 2003 [retrieved May 28, 2003]Retrieved from Internet: <http://computers.cnet.com/hardware/0–1027–405–20833353–1.html>.

IBM ThinkPad R40. PC Watch Japan, Jan. 29, 2003; [retrieved 2003–05–28] Retrieved from Internet: <http://pc.watch.impress.co.jp/docs/2003/0129/ibm.htm>.

* cited by examiner

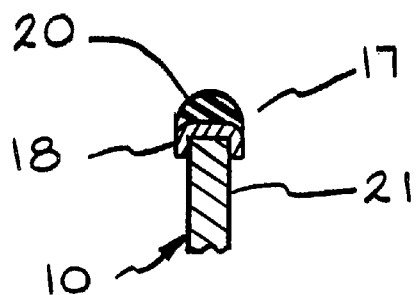
FIG. 3
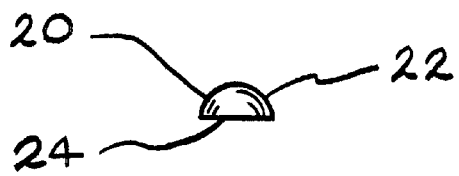
FIG. 4
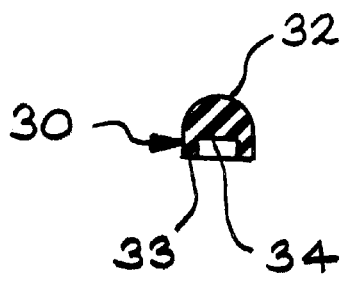 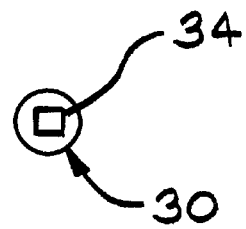
FIG. 5 FIG. 6

TEXTURED CUSHION FOR KEYBOARD CURSOR CONTROL STICK

CROSS REFERENCE TO RELATED APPLICATIONS

This application is a Continuation-In-Part of U.S. patent application Ser. No. 09/703,041, filed on Oct. 31, 2000, which was a Continuation-In-Part of U.S. patent application Ser. No. 09/281,126, filed on Mar. 29, 1999, now U.S. Pat. No. 6,140,998, which was a Divisional of Application Ser. No. 08/717,220 filed Sep. 26, 1996, now U.S. Pat. No. 5,889,508.

BACKGROUND OF THE INVENTION

This invention relates in general to a computer-input device and in particular to a cursor-pointing device (cursor control stick), of a notebook-type portable computer or similar device.

A finger mouse or cursor control stick, as used in this application, is a man-machine interface device, which controls the motion of a computer display cursor. In particular, a control stick is a type of miniature joystick, which is intended to be operated by the tip of one finger of the user.

Typically, a control stick is mounted in a central location on a computer keyboard, such as between the "G", "H" and "B" keys on a standard "QWERTY"-type keyboard. The control stick has a position sensing mechanism, which detects horizontal pressure in any horizontal direction. The cursor moves in a direction that corresponds to the direction of pressure exerted on the control stick and, in some embodiments, at a speed that corresponds to the amount of pressure exerted on the control stick. The control stick includes an elongated shaft. The shaft of the control stick has a small diameter, thus allowing the control stick to be mounted between the keys of the computer keyboard without causing the placement of the keys to vary greatly from that expected by an experienced user. A cap is typically removably mounted on the upper end of the control stick shaft, in order to provide an enlarged contact surface for a user to press against on the small diameter shaft of the control stick.

Heins, U.S. Pat. No. 6,019,534, discloses a gripping device for a writing instrument with a plurality of annular ribs formed of soft rubber with an internal gel filled chamber. It is known to use a gel material confined in a chamber as is shown in Heins.

SUMMARY OF THE INVENTION

Some models of control sticks have a cap with a hard smooth surface, which became slippery during use from perspiration or a build-up of natural body oils. Thus a user has to press their finger with relatively great force against the cap to prevent their finger from slipping on the surface of the cap. The need to press hard on the cap makes control difficult, since the user cannot use the finesse and delicate movements typically needed for rapid, accurate cursor movement. Also, pressing hard on the control stick is physically tiring to the finger, hand and forearm muscles of a user, and causes irritation, inflammation, and bruising of the finger tissue after a period of extended use.

A period of extended use, as used in this application, means a period of use of more than about one hour, and generally more than four hours and less than twelve hours. During such period of use, the user frequently manipulates the control stick. The frequency of manipulation of the control stick during a representative task, such as word processing, will typically be at least every ten minutes, on average, and may be much more frequently, depending on the particular task and the particular user.

Another type of a cap for a control stick has a hard textured outer surface. For example, one known control stick is equipped with a cap which is stippled with bumps which are about the same size and spacing as the abrasive on 150 grit sandpaper. While this approach may help prevent the slipping common with the earliest model cap, the textured cap is still irritating to the finger of a user when used extensively, even with the lighter touch allowed by the textured surface. The uneven and relatively hard surface of such caps still can cause inflamed tissue, bruising, soreness and finger fatigue in users which limits their ability to comfortably use such a control stick for periods of extended use.

The present invention provides a "cushioned" cap for a control stick, which cap may suitably be formed from two materials having different durometers (measures of hardness), with a finger contact surface which provides the needed finger-to-cap friction to easily use the control stick to move the cursor with a light touch, and which is formed of a relatively soft material, so that the cap does not irritate the body tissues of the user or result in finger fatigue, even after periods of extended use. A soft texturing may be added to the finger contact surface.

Various objects and advantages of this invention will become apparent to those skilled in the art from the following detailed description of the preferred embodiment, when read in light of the accompanying drawings.

BRIEF DESCRIPTION OF THE DRAWINGS

FIG. 3 is an enlarged sectional side view of the cap and the control stick illustrated in FIGS. 1 and 2.

FIG. 4 is a side view of the cushioned cap illustrated in FIGS. 1 through 3.

FIG. 5 is a sectional side view of a second embodiment of a cushioned cap in accordance with this disclosure.

FIG. 6 is a bottom plan view of the cap illustrated in FIG. 5.

FIG. 20a is an enlarged top view of a third embodiment of the cushioned cap with textured surface illustrated in FIG. 20, taken along the line 20a–20a.

FIG. 21a is an enlarged top view of a fourth embodiment of the cushioned cap with textured surface illustrated in FIG. 21, taken along the line 21a–21a.

DETAILED DESCRIPTION OF THE PREFERRED EMBODIMENT

Figure 1:
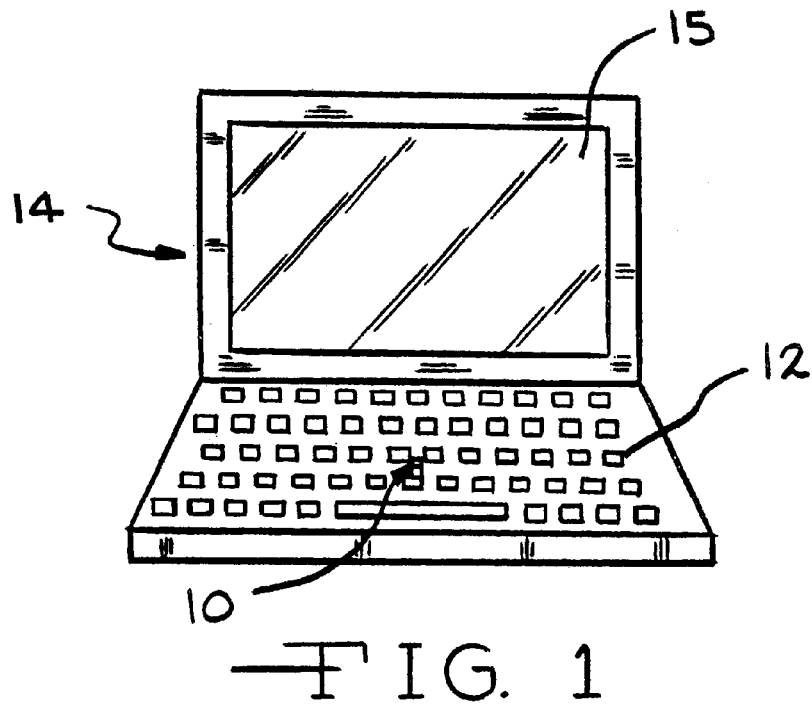
FIG. 1 is a perspective view of a typical portable computer employing a control stick having a cushioned cap in accordance with this invention.

Referring now to the drawings, FIGS. 1 through 6 illustrate a first embodiment of a control stick, indicated generally at 10, according to this invention. The illustrated control stick 10 is a miniature joy stick, such as the Trackpoint, Trackpoint II, or Trackpoint III control sticks on notebook computers sold by the International Business Machines Corporation. However, it will be appreciated, in light of the following disclosure, that the invention may be practiced on control devices other than such miniature joysticks. The cursor control stick of the present invention can be used in various devices such as computers, cellular phones, MP3 players, and personal digital assistants.

The control stick 10 is mounted in a keyboard 12 of a typical notebook-style microcomputer 14 having a pivotally mounted display screen 15. The control stick 10 is mounted at a first end (not shown) to the microcomputer 14, between the keys of the keyboard 12. A cap 18 is removably mounted on the other end 21 of the control stick 10. The control stick 10 is usually made of a plastic material, and translates the pressure on the cap 18 into a command to move a cursor on a video display of the computer 14.

The cap 18 of the control stick 10 is made of a relatively hard elastomeric material. At least a central portion of the outer surface 17 of the cap 18 is provided with an attached cushion 20. The cushion 20 can be made of any resilient material that can be attached to the outer surface 19 of the cap 18. Examples, which may be suitable materials, include soft rubber, soft foam, and polyurethane foam. The preferred material for the cushion 20 is polyurethane foam such as the type used in expandable earplugs. This type of foam product provides a finger contact surface that is relatively soft so as not to damage the tissues in the finger of a user during periods of extended use.

Hardness can be characterized by measuring the force applied to a given area which is required to compress or deflect a material a given distance. For example, a typical prior art cap, such as a cap supplied with the TrackPoint II control stick, is made of a relatively hard elastomeric material. During testing, a probe having a contact surface of approximately 1 square millimeter was pressed against such a cap to cause the probe to deflect the surface of the cap approximately 0.25 millimeters. A force of approximately 15 grams was required to compress the surface of the cap inwardly this small amount. In contrast, one embodiment of the cushion 20 of the present invention required a force of only 5 grams to be exerted by the probe to compress the surface of the cushion 20 the same distance. According to the invention, a cushion 20 having a measurement of hardness (or "durometer") which would permit a probe having a contact surface of approximately 1 square millimeter to deflect the surface of the cushion 20 by at least 0.25 millimeters when urged by a force of 10 grams, would generally be acceptable. The preferred embodiment of the invention has a hardness such that only 5 grams of force is required to cause a probe having a contact surface of 1 square millimeter to deflect the surface of the cushion 20 by at least 0.25 millimeters.

Preferably, the cushion 20 also provides a high coefficient of friction with the user's finger to permit easy positioning of the control stick 10. The polyurethane foam of the cushion 20 is yielding to a degree dependent upon the thickness of the cushion 20. The thickness of the cushion 20 can easily be modified during manufacture to any desired thickness.

Figure 2:
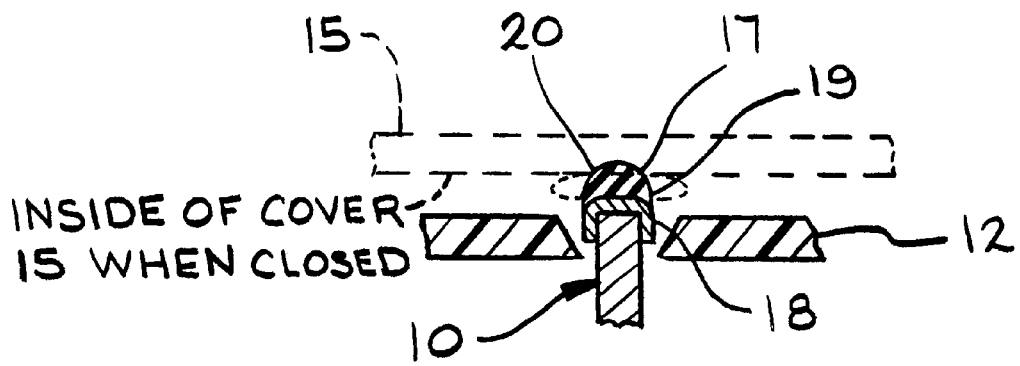
FIG. 2 is a side view, partly in section, of the control stick illustrated in FIG. 1.

Referring to FIG. 2, when the display screen 15 is folded down over the keyboard 12 for storage, as is typical for most notebook computers, the display screen 15 may contact the cushion 20. The cushion 20 is flattened as indicated by the phantom line 19, but will resiliently return to the position indicated by the solid outline of the cushion 20. The resiliency of the cushion 20 allows the cap 18 to have an enlarged contact surface area and greater height above the keyboard 12 for increased comfort of the user, without having to increase the spacing between the display screen 15 and the keyboard 12. It will be appreciated by those skilled in the art that the cushion 20 will preferably not be made from a material which would damage or stick to the display screen 15 if the display screen 15 contacts the cushion 20.

Referring to FIGS. 3 and 4, the cushion 20 is, preferably, a disk of material having a generally semi-circular cross section. However, the cushion 20 may have any suitable shape, such as that of a flat-ended or hollow-ended cylinder. In the illustrated embodiment, the cushion 20 has a convex end 22, and a second end 24. The convex end 22 is the contact surface of the cushion 20, that is, the surface that the user of the control stick 10 will contact to move the control stick 10. The convex end 22 will generally be a surface providing a good frictional interface. In the preferred embodiment, the convex end 22 is a sealed, smooth, easily cleaned surface, such as a closed cell skin formed on polyurethane foam. The resiliency of the cushion 20 permits the cushion 20 to be deformed and still provide excellent friction, even when the surface thereof is smooth. However, if desired, the surface of the convex end 22 may be textured or knurled. The second end 24 of the cushion 20 will be attached to the outer surface 19 of the cap 18 on the control stick 10. In the preferred embodiment, a suitable adhesive is used to attach the cushion 20 to the outer surface 19 of the cap 18.

FIG. 5 is a sectional view of a second embodiment of the cushion of this invention, indicated generally at 30. The cushion 30 is generally cylindrical and includes a convex end 32, and a relatively flat end 33 opposite the end 32. Although in the illustrated embodiment the end 32 is convex, the end 32 may be formed to any suitable shape, such as a flat or a concave surface, as may the end 22 of the cushion 20.

A recess 34 is defined in the cushion 30, which generally conforms to the outer surface of the end 21 of the control stick 10. For example, as shown in FIG. 6, the recess 34 may have a square perimeter, if the end 21 of the control stick 10 is square in cross-section. The control stick 10 extends into the recess 34. Preferably, to install the cushion 30 onto the control stick 10, a suitable adhesive is applied to the upper end 21 of the control stick, to the interior surface of the recess 34 in the cushion 30, or to both the upper end 21 of the control stick and to the interior surface of the recess 34 in the cushion 30. The cushion 30 is placed on the end 21 of the control stick 10 so that the cushion 30 adheres to the end 21 of the control stick 10. Of course, the cushion 30 could also be affixed to the control stick 10 by a resilient fit between the recess 34 of the cushion 30 and the end 21 of the control stick 10. The cushion 30 is comprised of a soft material to permit use for an extended period of time without causing irritation to the finger tissue.

It may be desirable to manufacture the cushion 30 with portions having different levels of hardness. For example, the convex end 32 could be softer than the area of the cushion 30 surrounding the recess 34. The harder area surrounding the recess 34 would assist in retaining the cushion 30 on the control stick 10 by maintaining its form, while the convex end 32 of the cushion could be relatively soft.

One method of manufacturing the cushion 30 with portions having different levels of hardness would involve simultaneously injecting two separate types of material simultaneously into a cavity of single mold to form the cushion 30. For example, a first material having relatively soft properties would be injected in the mold at the area where the convex end 32 is formed, and a second material which is harder than the first material would be injected in the mold at the area where the recess 34 is formed. Accelerating agents, compatabilizing agents, fillers, mold release agents, and coloring agents can be introduced as well, as will be appreciated by those skilled in the art. Somewhere between the two ends 32 and 33, the first and second materials come into contact and become affixed to one another. The cushion 30 would, therefore, be a single structure formed from two different materials, having different hardness characteristics when set or cured. For the purposes of the present invention, curing can be accomplished by using any suitable methods of solidifying or hardening a material, such as for example, by adding or removing heat, inducing a catalytic reaction, or containment for a period of time to allow hardening to occur.

Another method of manufacturing the cushion 30 having multiple areas with different levels of hardness would be to form the cushion 30 from a single material, but altering the setting or formation of the material so that the different areas have different hardness characteristics. This alteration of the formation process can be accomplished by varying the temperature gradient surrounding the mold, creating miniature air pockets within selected portions of the material, or by any other suitable manufacturing process.

As an alternate embodiment, it is contemplated that a cushion of the invention could be formed to completely encompass the cap 18 shown in FIGS. 2 and 3, except where the shaft of the control stick 10 extends outwardly therefrom. Such a cushion would have a cavity therein, which includes a flange of material about an opening into the cavity. Such a flange of material would restrict the size of the opening into the cavity to a diameter which is less than the diameter of the cap 18, and thus retain the cushion on the cap 18, either alone or in combination with a suitable adhesive. The opening into such a cushion could be resiliently expanded to slip the cushion onto the cap 18 during assembly, or when the cushion is replaced.

Although the preferred embodiment of the cushion 20 or 30 is for use on a portable notebook computer 14, it is envisioned that the cushion 20 or 30 could be used on any keyboard or in any convenient location on any instrument requiring a control stick-like movement.

It is contemplated that the cushions 20 or 30 of the present invention can be sold separately from a notebook-type portable computer as replacements or substitutes to the original control stick and cap configuration. The cushions 20 or 30 can be sold in a kit form, which preferably includes the necessary materials to affix the cushions 20 or 30 to a control stick of a computer. The kit may include a plurality of cushions 20 or 30 and a suitable adhesive material, such as a container of contact cement or a pressure sensitive self-adhesive strip which is pre-applied to the cushions 20 or 30. For example, if contact cement is supplied with the kit, the user simply applies a coating of contact cement to either the originally supplied cap 18 or the end 21 of the control stick 10, depending on the type of cushion 20 or 30 used. A coating of contact cement is also applied to the cushion 20 or 30. The coatings of contact cement are then allowed to dry. The cushion 20 or 30 is then pressed against the coated portion of the original cap 18 or control stick 10, thereby affixing the cushion 20 or 30 to the control stick 10.

Figure 7:
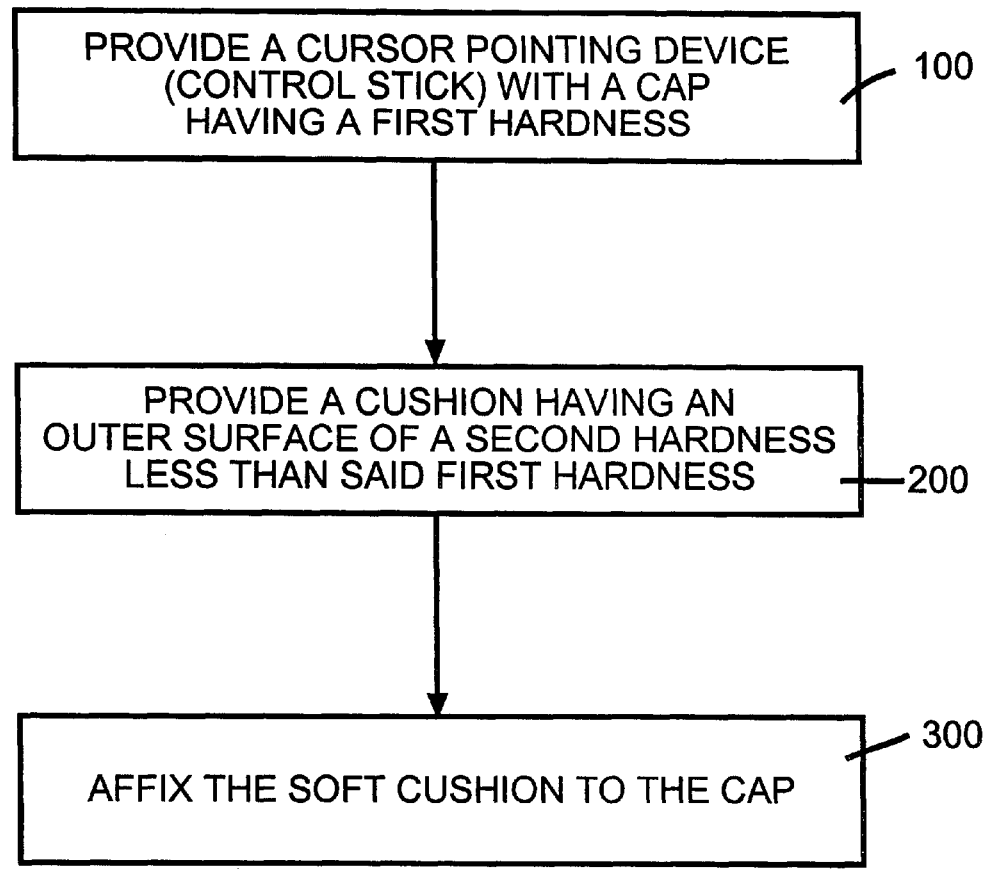
FIG. 7 is a flowchart illustrating a method of manufacturing a control stick in accordance with this disclosure.

FIG. 7 is a flow diagram of a method of forming a cushioned control stick according to the invention. The method of forming a cushioned control stick may be summarized as follows: In a first step 100, a cursor pointing device (control stick) with a cap having a first hardness is provided. In a second step 200, a soft cushion is provided which has an outer surface of a second hardness which is less than the first hardness of the cap (i.e., the cushion is softer than the cap). In a third step 300, the soft cushion is affixed to the relatively harder cap.

It will be appreciated that the soft cushions described above may be formed in a variety of ways, of a variety of materials. For instance, in an embodiment shown in FIG. 8, a cushion, indicated generally at 400, is formed of a gel material. As used herein, the term gel means a semi-rigid solid, and includes a colloidal suspension of a solid dispersed in a liquid, and materials with similar characteristics as load bearing surfaces (e.g., stiffness, hardness, malleability, etc.).

The cushion 400 preferably has a generally cylindrical lower portion 402, and a generally conic upper portion 404, which increases in diameter toward an upper surface 406 of the cushion 400. Thus, at least a portion of the upper portion 404 is generally frustoconical. The upper surface 406 is preferably formed with a depression 408 therein that is suitable to receive a fingertip of a user.

Like the cushions described in the other embodiments above, the cushion 400 will deform if pressed against the computer display screen. It is contemplated that the cushion 400 may be manufactured to have a suitable relatively rigid pocket (seen in FIGS. 9 and 10) to accept the upper end of a control stick of a computer, such as the control stick 10. It is also contemplated that the cushion 400 could otherwise be fixed to a control stick cap like the cap 18 in FIG. 2, such as by adhesively fixing the cushion 400 to the cap. It is also contemplated that the cushion 400 may be manufactured to form an integral part of a removable control stick or portion of a control stick (not shown).

Figure 9:
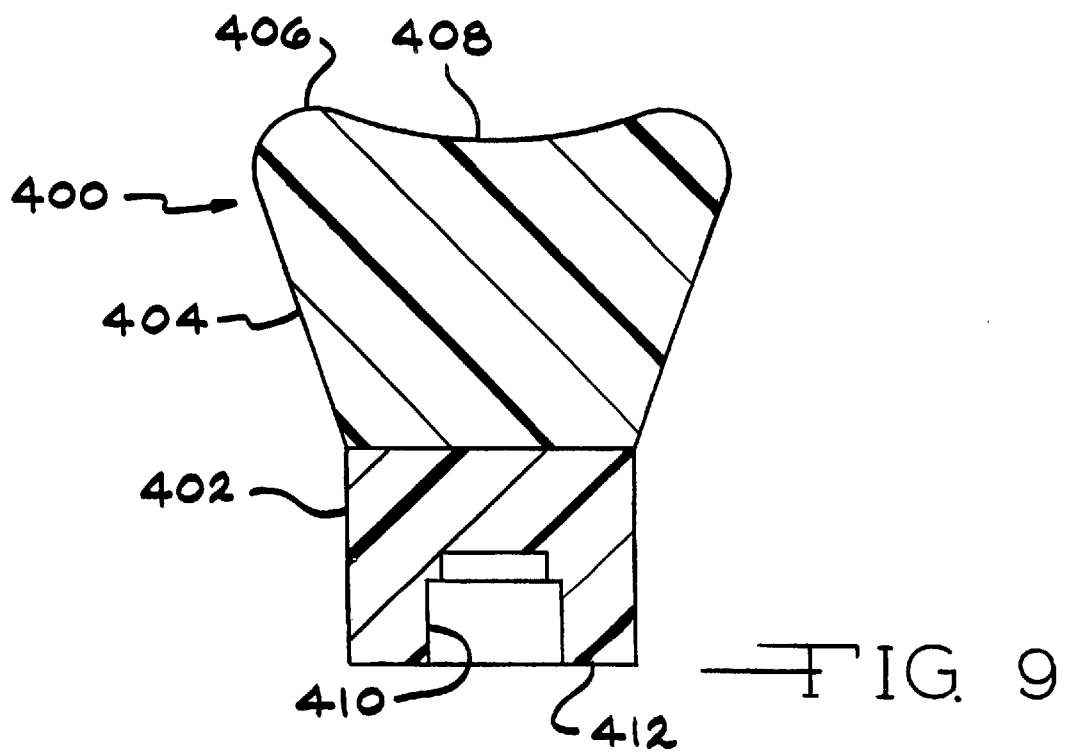
FIG. 9 is a side sectional view of the gel cushion of FIG. 8.

FIG. 9 is a cross sectional view of the cushion 400. The upper portion 404 of the cushion 400 is made from a different material than the lower portion 402. The upper portion 404 may be made from any suitable material. It is believed that thermoplastic elastomeric compounds such as KRATON® thermoplastic elastomers (available from the Royal Dutch/Shell Group) or thermoplastic rubber compounds such as SANTOPRENE® (available from Advanced Elastomer Systems, L.P., 388 South Main Street, Akron, Ohio, U.S.A. 44311) may be particularly suitable for this application. The material from which the upper portion 404 is formed is selected to have a relatively low hardness, so that the upper portion 404 is relatively soft and compliant. The upper portion 404, in a preferred embodiment, is cured to a Shore A durometer of about 3 to about 10, though of course some variance from this softness may be desirable in certain applications, particularly if other features, such as air pockets in the material of the cushion 400, are provided that affect the overall feel of the cushion 400. The material of the upper portion 404 may be a gel or a gel contained in a non-gel pocket. The lower portion 402 defines a pocket 410 in a lower surface 412 thereof. The pocket 410 is adapted to receive the upper end of a cursor control stick, such as the cursor control stick 10. The lower portion 402 is preferably formed of a material with a higher durometer than the upper portion 404. The lower portion 402 may, nevertheless, be formed of any suitable material. It is believed that thermoplastic rubber compounds may be particularly suitable for this application. The lower portion 402 is preferably cured to be relatively harder than the upper portion 404, such as to a Shore A durometer of about 55 to about 65.

These thermoplastic elastomeric and rubber materials are believed to be particularly suitable because of the tack their surfaces have, which gives the cushion 400 a smooth, non-irritating, yet non-slip surface for improved performance.

The cushion 400 may be formed with any suitable machinery of any suitable material by any suitable process. Thermoplastic rubber compounds, for example, can be injection molded, extruded, blow molded and thermoformed with the efficiency and economy associated with thermoplastic materials. As a further example, the cushion 400 may be formed of thermoplastic rubber compounds using a two-step injection process on standard thermoplastic injection molding equipment. In a preferred process, illustrated in FIG. 23, the cushion 400 is formed in a two step injection molding process.

In a first step 451, a first mold is provided, shaped to form one of the lower portion 402 and the upper portion 404. In one preferred embodiment, the first mold is shaped to form the lower portion 402.

In a second step 452, a first material curing to a first durometer is injected into the first mold. In the preferred embodiment in which the first mold is the lower portion 402, the first material is a thermoplastic rubber material that will have a Shore A durometer of about 55 to about 65 when fully cured.

In a third step 453, a second mold is provided, shaped to form the other of the lower portion 402 and the upper portion 404. In the preferred embodiment in which the first mold is the lower portion 402, the second mold is shaped to form the upper portion 404.

In a fourth step 454, the molded first material is removed while only partially cured, and placed into the second mold.

In the preferred embodiment, the first material is removed from the first mold as soon as sufficiently cured to be parted from the first mold.

In a fifth step 455, a second material curing to a second durometer, different from the first durometer, is injected into the second mold in contact with the partially cured first material so that the second material bonds to portions of the partially cured first material with which the second material comes into contact. In the preferred embodiment in which the first mold provided in step 451 is the lower portion 402, the second material is a thermoplastic rubber material that will have a Shore A durometer of about 3 to about 10 when fully cured and will form the upper portion 404. The upper portion 404 is thus overmolded onto the partially cured lower portion 402, with the material of the upper portion 404 chemically bonding with the material of the lower portion 402.

In a sixth step 456, both the first and second materials are removed from the second mold. One or both of the first and second materials may be fully cured before the bonded first and second materials are removed from second mold. Similarly, one or both of the first and second materials may only be partially cured before the bonded first and second materials are removed from second mold.

In a preferred embodiment, the mold for the upper portion 404 has an abraded inner surface such that the upper surface 406 of the upper portion 404 is textured corresponding to the abraded surface of the mold. The inner surface of the mold may be abraded in any conventional manner, such as by sand blasting or by electrical discharge machine. In a preferred embodiment, the mold for the upper portion 404 has an inner surface with a textured pattern such that the upper surface 406 of the upper portion 404 is textured corresponding to the textured surface of the mold.

Figure 10:
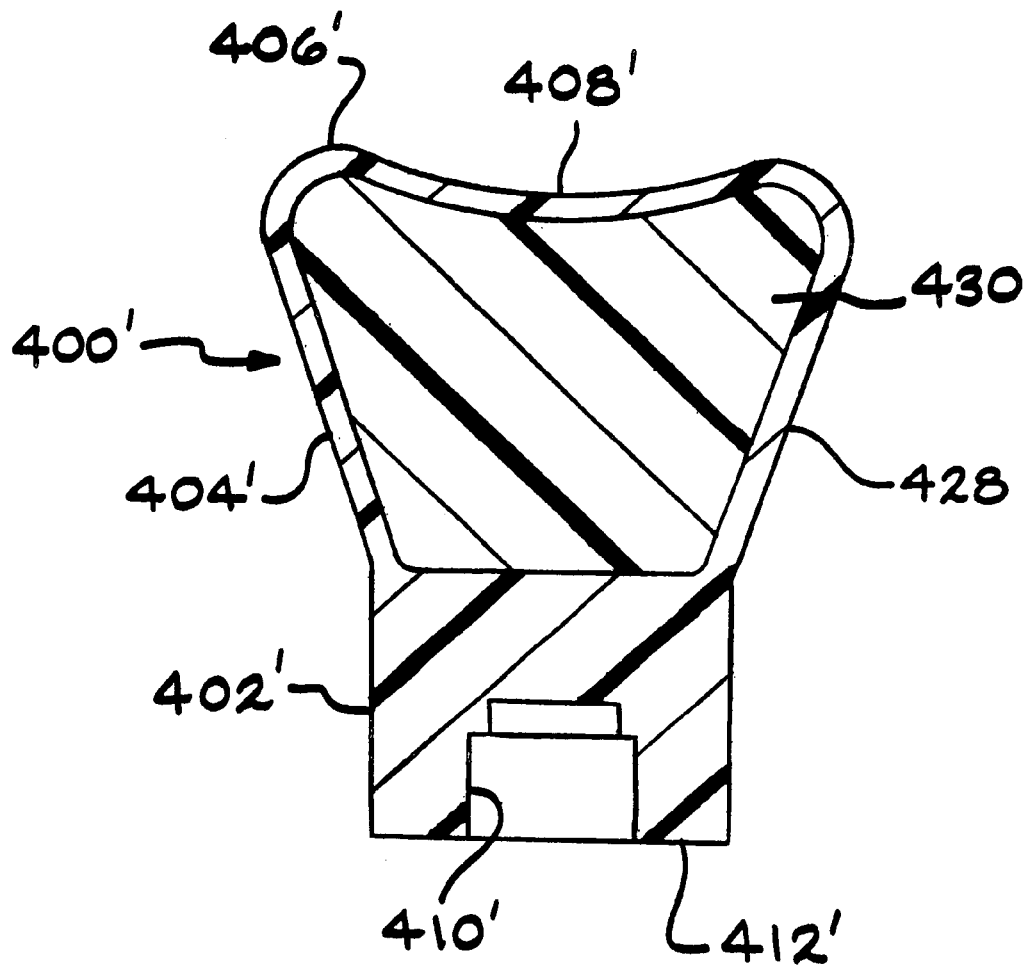
FIG. 10 is a view similar to FIG. 9, except showing an alternate embodiment of the gel cushion.

An alternate embodiment of the cushion 400 is illustrated by the cross sectional view of FIG. 10. A cushion 400' is similar in outer shape to the cushion 400 illustrated in FIG. 8, and has similar qualities of deformation for comfort and protection of computer display screens, and smoothness and tack for ergonomic reasons. However the cushion 400' is constructed somewhat differently, as will be described.

Like the cushion 400, the cushion 400' preferably has a generally cylindrical lower portion 402', and a generally conic upper portion 404', which increases in diameter toward an upper surface 406' of the cushion 400'. The upper surface 406' is preferably formed with a depression 408' therein that is suitable to receive a fingertip of a user.

The lower portion 402' of the cushion 400' is formed of any suitable material, and, like the cushion 400, is preferably formed of a thermoplastic rubber compound such as SANTOPRENE® thermoplastic rubber. The lower portion 402 defines a pocket 410' in a lower surface 412' thereof. The pocket 410', like the pocket 410 in the cushion 400, is adapted to receive the upper end of a cursor control stick, such as the cursor control stick 10.

The upper portion 404' of the cushion 400' is of somewhat different structure that the cushion 400. The outer surface of the upper portion 404' is an envelope 428, which may be formed of any suitable material. It is believed that a thermoplastic rubber compound such as SANTOPRENE® thermoplastic rubber would be suitable in this application, and the envelope 428 is preferably formed integrally with the lower portion 402'. The envelope 428 is filled with a suitable material 430. The material 430 may be any suitable gel, such as a silicone gel, or a thermoplastic elastomeric compound such as KRATON® thermoplastic elastomer formulated to form a low durometer (hardness) (i.e., to form a very soft) material.

Figure 11:
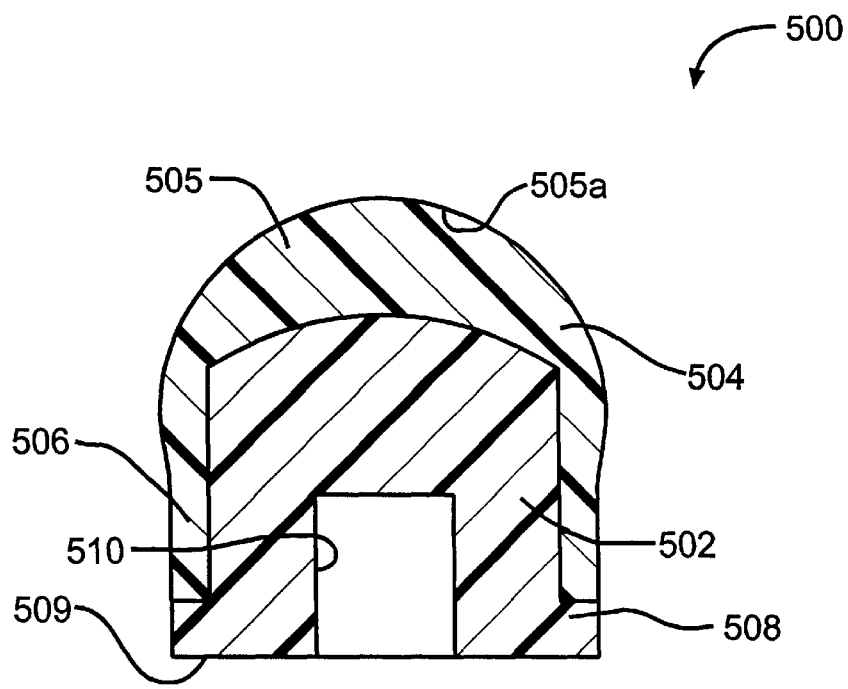
FIG. 11 is a view similar to FIG. 9, except showing an alternate embodiment of the gel cushion.

FIG. 11 is a cross sectional view of an alternate embodiment of the cushion of this invention, indicated generally at 500. The cushion 500 preferably has a generally cylindrical lower portion 502, and a generally cup-shaped upper portion 504. The upper portion 504 overlays and is bonded to a portion of the lower portion 502 that is disposed within the cup-shaped upper portion 504

The upper portion 504 includes a central portion 505 that may be generally described as convex-concave lens shaped, in that the central portion 505 is dished and increases in thickness toward the center of the central portion 505. The upper portion 504 includes an upper surface 505a. The upper surface 505a may be textured as is described in the embodiments illustrated in FIGS. 20 through 23. The upper portion 504 also includes a depending skirt portion 506 formed at the circumferential periphery of the central portion 505. The upper portion 504 may be made from any suitable material, such as a foam or a gel or a thermoplastic rubber. The material from which the upper portion 504 is formed is selected to have a relatively low hardness, so that the upper portion 504 is relatively soft and compliant. The upper portion 504 is preferably formed from a material like the suitable material described for the upper portion 404 of FIGS. 8 and 9, and will have a Shore A durometer of about 3 to about 10 when fully cured.

Figure 12:
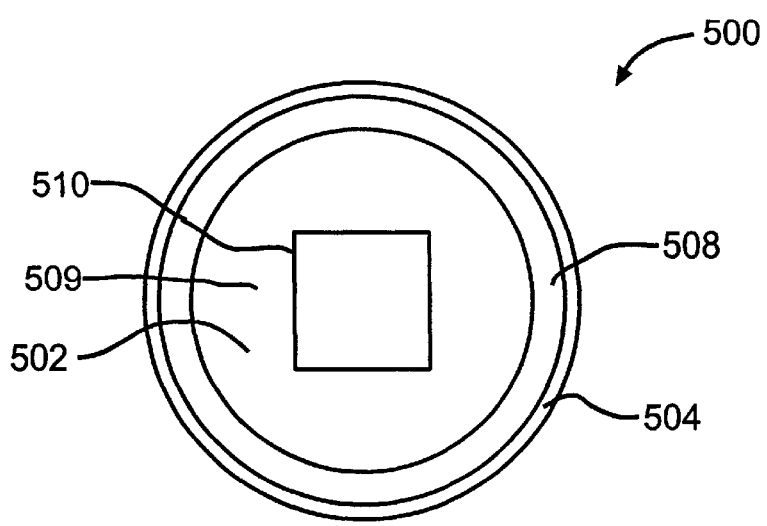
FIG. 12 is a bottom plan view of the gel cushion illustrated in FIG. 11.

As shown in FIGS. 11 and 12, the lower portion 502 is generally cylindrical and partially disposed within the depending skirt 506 of the upper portion 504. The lower portion 502 preferably includes a flange 508 that extends radially outwardly from a lower-most part of the lower portion 502. The depending skirt 506 abuts the flange 508, and is preferably bonded thereto. The lower portion 502 has a lower surface 509. The lower surface 509 defines a pocket 510 in a central portion thereof. The pocket 510 is adapted to receive the upper end of a cursor control stick, such as the cursor control stick 10 (seen in FIGS. 1 and 2). Preferably, the pocket 510 (and indeed, any of the pockets described in this application as receiving a cursor control stick) is preferably sized to receive the cursor control stick with a stretch fit; the pocket 510 as formed is slightly smaller in cross-section than the cursor control stick. When installing the cushion 500 on a cursor control stick, the cursor control stick is forced into the pocket 510, which stretches the material of the lower portion 502 to accommodate the larger cross section of the cursor control stick. The resulting elastic forces hold the cushion 500 on the cursor control stick through friction, creating an elastic or stretch fit between the pocket 510 and the cursor control stick 10.

Figure 8:
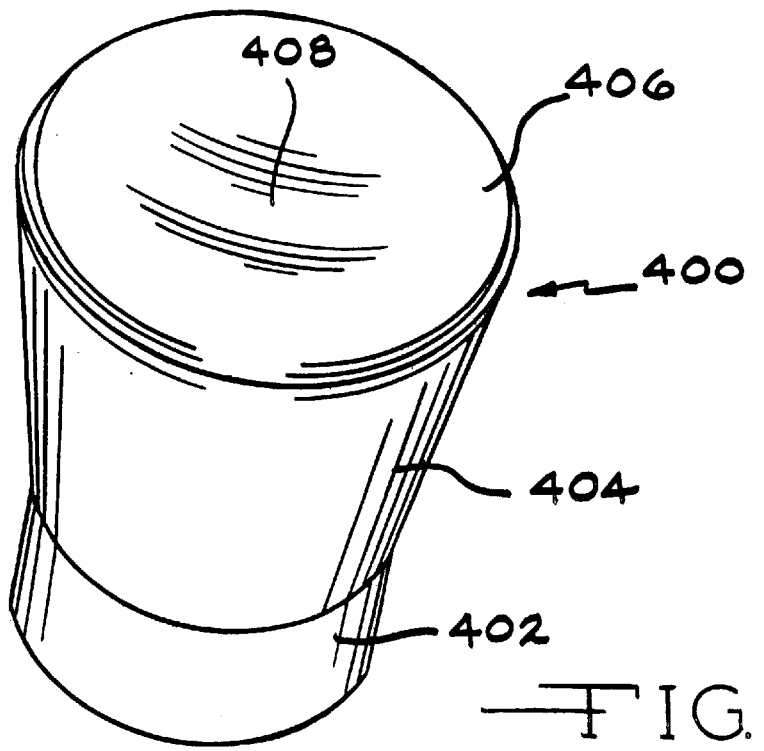
FIG. 8 is perspective view of a gel cushion for a keyboard cursor control stick.

The lower portion 502 is preferably formed of a material with a higher durometer than the upper portion 504, but the lower portion 502 may, nevertheless, be formed of any suitable material, such as the material described as suitable for the lower portion 402 of the cushion 400 illustrated in FIGS. 8 and 9.

Like the cushions described in the other embodiments in this application, the cushion 500 will deform if pressed against the display screen. It is contemplated that the cushion 500 may be manufactured to have a suitable relatively rigid pocket 510 (shown in FIGS. 11 and 12) to accept the upper end of a control stick of a computer, such as the control stick 10. It is also contemplated that the cushion 500 could otherwise be fixed to a control stick cap like the cap 18 in FIG. 2, such as by adhesively fixing the cushion 500 (with an appropriately shaped pocket 510) to such a control stick cap. It is also contemplated that the cushion 500 could be fixed to such a control stick cap by having a pocket 510, which is sufficiently deep to completely contain such a cap therein. In this embodiment, an inwardly extending flexible flange (not shown) of the lower portion 502 of the cushion 500 will resiliently extend under a portion of the cap after the cap is inserted into the pocket 510 to retain the control stick cap in the pocket 510. It is also contemplated that the cushion 500 may be manufactured to form an integral part of a removable control stick or portion of a control stick (not shown).

The cushion 500 may be formed by any suitable process on standard thermoplastic equipment. Thermoplastic rubber compounds or thermoplastic elastomeric compounds, for example, can be injection molded, extruded, blow molded and thermoformed with the efficiency and economy associated with such materials. In a preferred process, the cushion 500 is formed in a two step injection molding process, such as was described above with respect to the cushion 400 and illustrated in FIG. 23.

Figure 13:
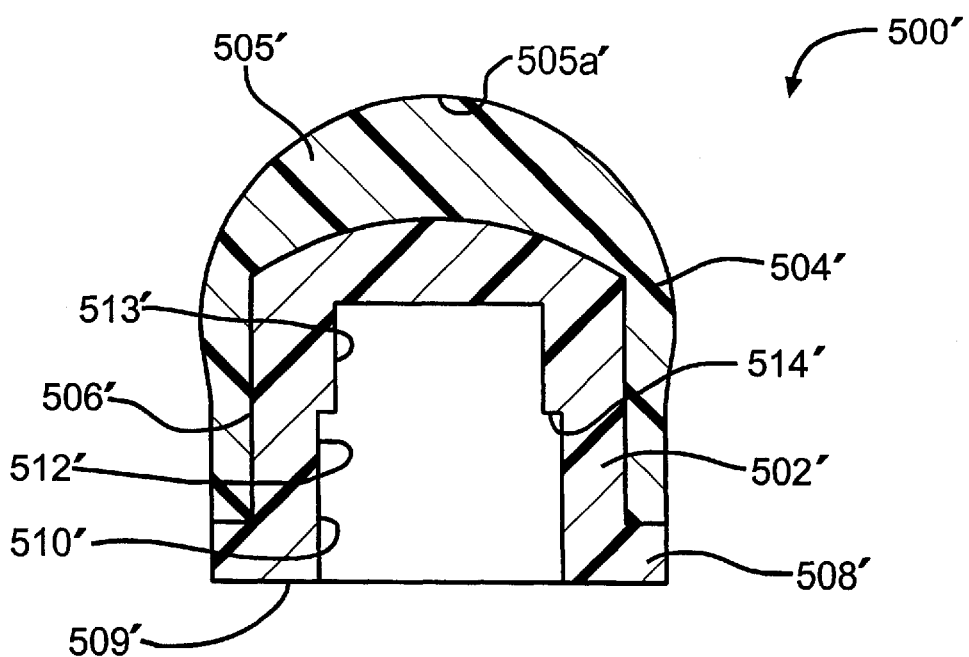
FIG. 13 is a view similar to FIG. 11, except showing an alternate embodiment of the gel cushion.
Figure 14:
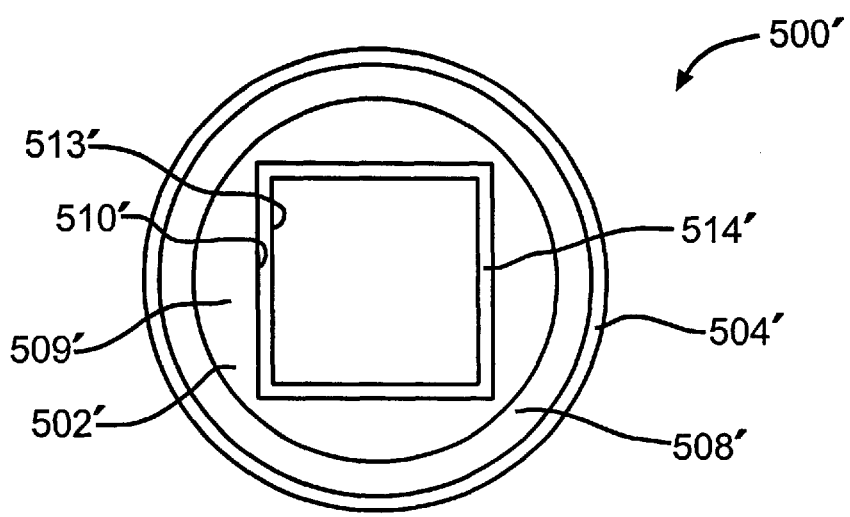
FIG. 14 is a bottom plan view of the gel cushion illustrated in FIG. 13.

An alternate embodiment of the cushion 500 is illustrated at 500' in FIGS. 13 and 14. The cushion 500' is similar in outer shape to the cushion 500 illustrated in FIG. 11, and has similar qualities of deformation for comfort and protection of computer video screens, and smoothness and tack for ergonomic reasons and may be constructed of similar material as the cushion 500. However the cushion 500' is constructed somewhat differently, as will be described.

Like the cushion 500, the cushion 500' preferably has a generally cylindrical lower portion 502' and a generally cup-shaped upper portion 504'. The upper portion 504' may have a structure and composition identical to the upper portion 504 described above. The upper portion 504' includes an upper surface 505a'. The upper surface 505a' may be textured as is described in the embodiments illustrated in FIGS. 20 through 23.

The lower portion 502' of the cushion 500' may be formed of any suitable material. Like the cushion 500, the lower portion 502' is preferably formed of a thermoplastic rubber compound such as SANTOPRENE® thermoplastic rubber with a formulation that cures to a Shore A durometer above 55. The lower portion 502' has a lower surface 509'. The lower surface 509' defines a pocket 510' in a central portion thereof. The pocket 510', like the pocket 510 in the cushion 500, is shaped to receive the upper end of a cursor control stick, such as the cursor control stick 10. In the illustrated embodiment the pocket 510 is rectilinear, having a rectangular cross section adapted to receive a control stick with a rectangular cross-section.

Figure 15:
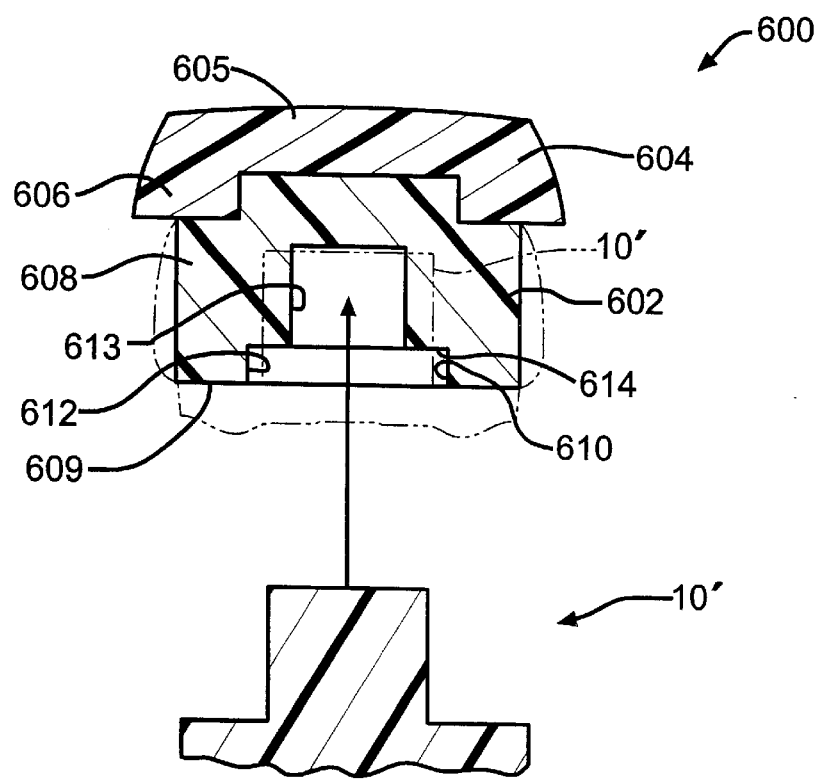
FIG. 15 is a view similar to FIG. 11, except showing an alternate embodiment of the gel cushion and with stick guide.
Figure 16:
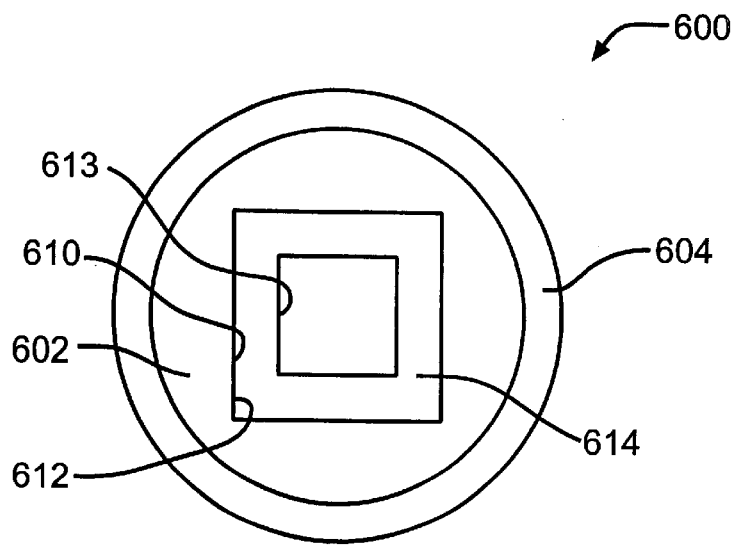
FIG. 16 is a bottom plan view of the gel cushion illustrated in FIG. 15.

The pocket 510' of the cushion 500' is of somewhat different structure than that of pocket 510 of the cushion 500, being a stepped recess. A first recess 512' is defined in the interior end surface of the pocket 510' with slightly larger cross-section than that of a second recess 513'. A step 514' is thereby formed between the first recess 512' and the second recess 513'. As illustrated, a cursor control stick (not shown) does not engage the second recess 513' of the pocket 510', although such is not required. The second recess 513' creates a void of stiff material below the central portion 505'. The void gives the central portion 505' a softer feel to the user. An alternate embodiment of the cushion of this invention, indicated generally at 600, is shown in FIGS. 15 and 16. The cushion 600 preferably has a generally cylindrical lower portion 602, and a generally cup-shaped upper portion 604. The upper portion 604 overlays and is bonded to a portion of the lower portion 602 that is disposed within the cup-shaped upper portion 604.

The upper portion 604 includes a central portion 605 that is preferably flat in shape. The upper portion 604 also includes a depending skirt portion 606 formed at the circumferential periphery of the central portion 605. The upper portion 604 may be made from any suitable material, such as a foam or a gel or a thermoplastic rubber or thermoplastic elastomeric compound. The material from which the upper portion 604 is formed is selected to have a relatively low hardness, so that the upper portion 604 is relatively soft and compliant. The upper portion 604 is preferably formed from a material like the suitable material described for the upper portion 404 of the cushion 400 illustrated in FIGS. 8 and 9.

As shown in FIGS. 15 and 16, the lower portion 602 is generally cylindrical and partially disposed within the depending skirt 606 of the upper portion 604. The lower portion 602 preferably includes a relatively thick flange 608 that extends radially outwardly from a lower-most part of the lower portion 602. The depending skirt 606 abuts the flange 608, and is preferably bonded thereto. The lower portion 602 has a lower surface 609. The lower surface 609 defines a pocket 610 in a central portion thereof. The pocket 610 is a stepped recess, having a first recess 612 defined in the interior end surface of the pocket 610 with slightly larger cross-section than that of the second recess 613. A step 614 is thereby formed between the first recess 612 and the second recess 613. The pocket 610 is adapted to receive the upper end of a cursor control stick 10'. Preferably, the second recess 613 of the pocket 610 (and indeed, any of the pockets described in this application as receiving a cursor control stick) is sized with a cross-section greater than the cross-section of the cursor control stick 10', and the cross-section of the first recess 612 being slightly smaller than the cross-section of the cursor control stick 10'. During the installation of the cushion 600 on the cursor control stick 10', the cursor control stick 10' is fitted into the pocket 610, with the upper end of the cursor control stick 10' engaging the step 614, the cushion 600 is thereby roughly aligned with the cursor control stick 10'. The cushion 600 is then pushed downwardly onto the cursor control stick 10', driving the cursor control stick 10' relatively upwardly into the second recess 613, to engage the walls of the second recess 613 with a stretch fit; in the same manner described above for the pocket 510 of the cushion as illustrated in FIG. 11. As is indicated in the phantom view, when the cursor control stick 10 is received in the pocket 610, the lower portion 602 of the cushion 600 may be slightly deformed as a result of the stretching as shown.

The lower portion 602 is preferably formed of a material with a higher durometer than the upper portion 604, but the lower portion 602 may, nevertheless, be formed of any suitable material, such as the material described as suitable for the lower portion 402 illustrated in FIGS. 8 and 9.

Like the cushions described in the other embodiments in this application, the cushion 600 will deform if pressed against the display screen. As discussed above, it is contemplated that the cushion 600 may be manufactured to have a suitable relatively rigid pocket 610 (shown in FIGS. 15 and 16) to accept the upper end of the control stick 10. It is also contemplated that the cushion 600 could otherwise be fixed to a control stick cap like the control stick cap 18 illustrated in FIG. 2, such as by adhesively fixing the cushion 600 (with an appropriately shaped pocket 610 to such a control stick cap. It is also contemplated that the cushion 600 could be fixed to such a control stick cap by having a pocket 610, which is sufficiently deep to completely contain such a cap therein. The lower portion 602 of such a cushion 600 could have an inwardly extending flexible flange (not shown) which would resiliently extend under a portion of the cap after the cap is inserted into the pocket 610 to retain the control stick cap in the pocket 610. It is also contemplated that the cushion 600 may be manufactured to form an integral part of a removable control stick or portion of a control stick (not shown).

The cushion 600 may be formed by any suitable process on standard equipment. Thermoplastic rubber compounds and thermoplastic elastomeric compounds, for example, can be injection molded, extruded, blow molded and thermoformed with the efficiency and economy associated with thermoplastic materials. In a preferred process, the cushion 600 is formed in a two step injection molding process, as was described above with respect to the cushion 400 and FIG. 23.

Figure 17:
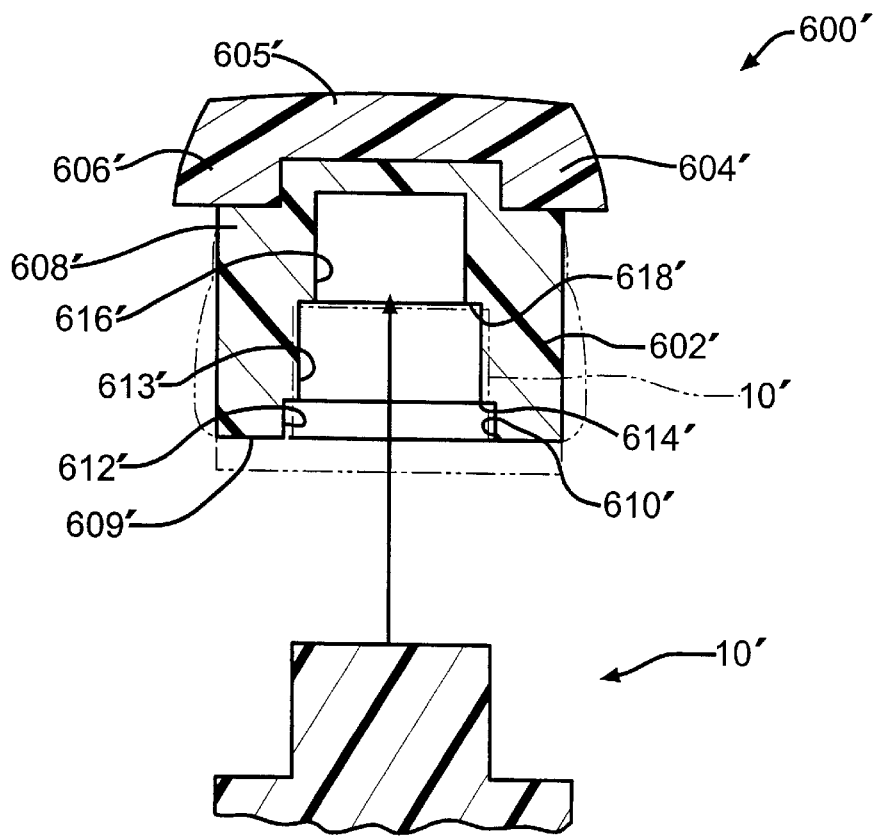
FIG. 17 is a view similar to FIG. 13, except showing an alternate embodiment of the gel cushion and with stick guide.
Figure 18:
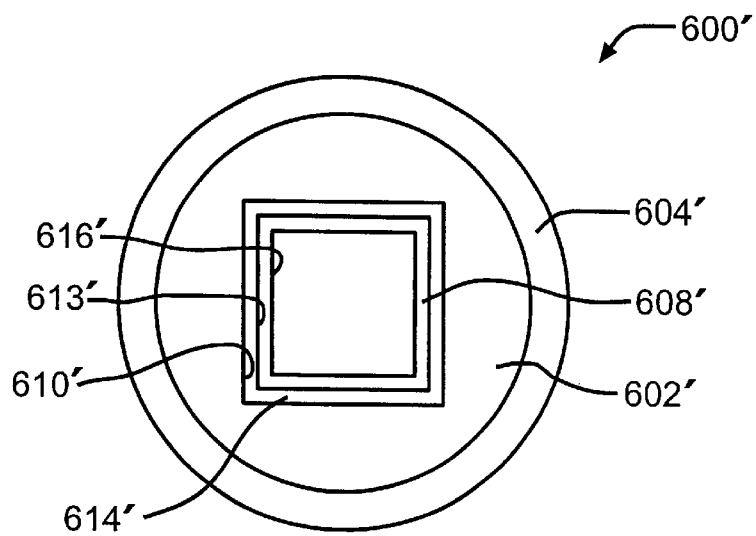
FIG. 18 is a bottom plan view of the gel cushion illustrated in FIG. 17.

An alternate embodiment of the cushion 600 is illustrated at 600' in FIGS. 17 and 18. The cushion 600' is similar in outer shape to the cushion 600 illustrated in FIG. 15, and has similar qualities of deformation for comfort and protection of computer video screens, and smoothness and tack for ergonomic reasons and may be constructed of similar material as the cushion 600. However the cushion 600' is constructed somewhat differently, as will be described.

Like the cushion 600, the cushion 600' preferably has a generally cylindrical lower portion 602' and a generally cup-shaped upper portion 604'. The upper portion 604' may have a structure and composition identical to the upper portion 604 described above. However, the upper portion 604' may include a flange portion 611'. The flange portion 611' extends radially outwardly from the upper portion 604'.

The lower portion 602' of the cushion 600' may be formed of any suitable material. Like the cushion 600, the lower portion 602' is preferably formed of a thermoplastic rubber compound such as SANTOPRENE® thermoplastic rubber with a formulation that cures to a Shore A durometer above 55. The lower portion 602' has a lower surface 609'. The lower surface 609' defines a pocket 610' in a central portion thereof. The pocket 610', like the pocket 610 in the cushion 600, is shaped to receive the upper end of a cursor control stick, such as the cursor control stick 10'. In the illustrated embodiment the pocket 610' has a rectangular cross section adapted to receive the cursor control stick 10' which has a rectangular cross-section.

The pocket 610' of the cushion 600' is of somewhat different structure than that of pocket 610 of the cushion 600, being a two-stepped recess. A first recess 612' defined in the interior surface of the pocket 610' with slightly larger cross-section than that of second first recess 613'. A step 614' is thereby formed between the first recess 612' and the second recess 613'. A third recess 616' with a slightly smaller cross-section than that of the second recess 613' is defined in the interior end surface of the pocket 610'. A step 618' is thereby formed between the second recess 612' and the third recess 616'. During the installation of the cushion 600' on the cursor control stick 10', the cursor control stick 10' is fitted into the pocket 610', with the upper end of the cursor control stick 10' engaging the step 614', the cushion 600' is thereby roughly aligned with the cursor control stick 10'. The cushion 600' is then pushed downwardly onto the cursor control stick 10', driving the cursor control stick 10' relatively upwardly into the second recess 613', to engage the walls of the second recess 613' with a stretch fit; in the same manner described above for the pocket 510 of the cushion as illustrated in FIG. 11. As is indicated in the phantom view, when the cursor control stick 10 is received in the pocket 610', the lower portion 602' of the cushion 600' may be slightly deformed as a result of the stretching as shown. As illustrated, the cursor control stick 10' does not engage the third recess 616' of the pocket 610', although such is not required. The third recess 616' creates a void of stiff material below the central portion 605'. This void gives the central portion 605' a soft feel to the user similar to the soft feel of the central portion 505', without having the thickness of soft material of the central portion 505'.

Figure 19:
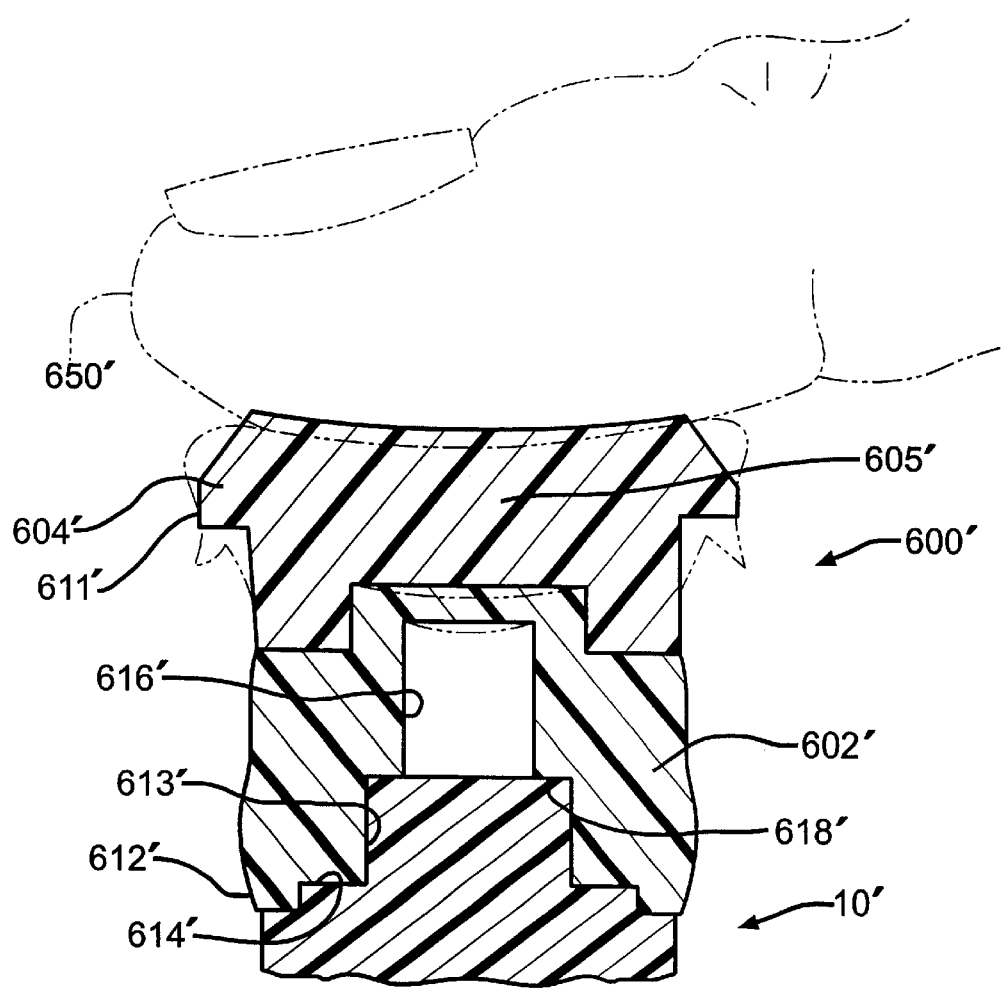
FIG. 19 is a view similar to FIG. 16, with the gel cushion deformed under the pressure of a user's finger.

As is illustrated in FIG. 19, the cursor control stick 10' is received in the pocket 610 of the cushion 600. The lower portion 602 of the cushion 600 may deform as shown when the cursor control stick 10' is received in the pocket 610. As is also indicated in the phantom view, the cushion 600 may deform under the pressure of a user's finger 650.

In some applications it may be desirable to provide a textured surface on the cap. Any suitable texture pattern may be provided. Raised nubs and raised ridges are among the patterns which may be suitable.

Figure 20:
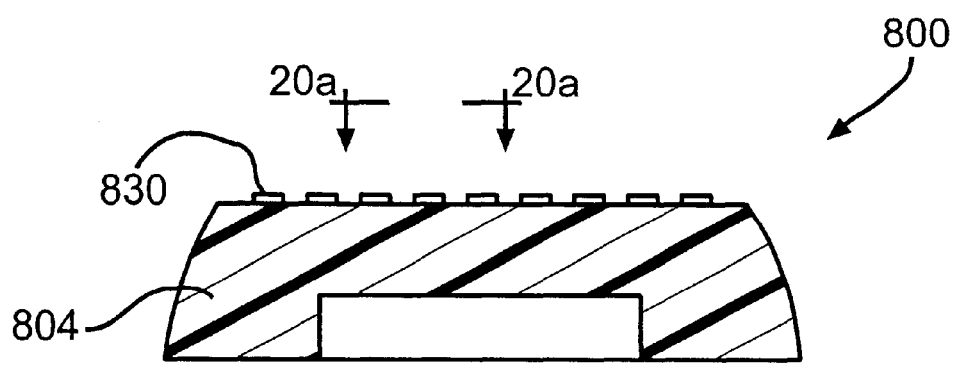
FIG. 20 is a cross sectional view of the cushioned cap illustrated in FIG. 18.
Figure 20A:
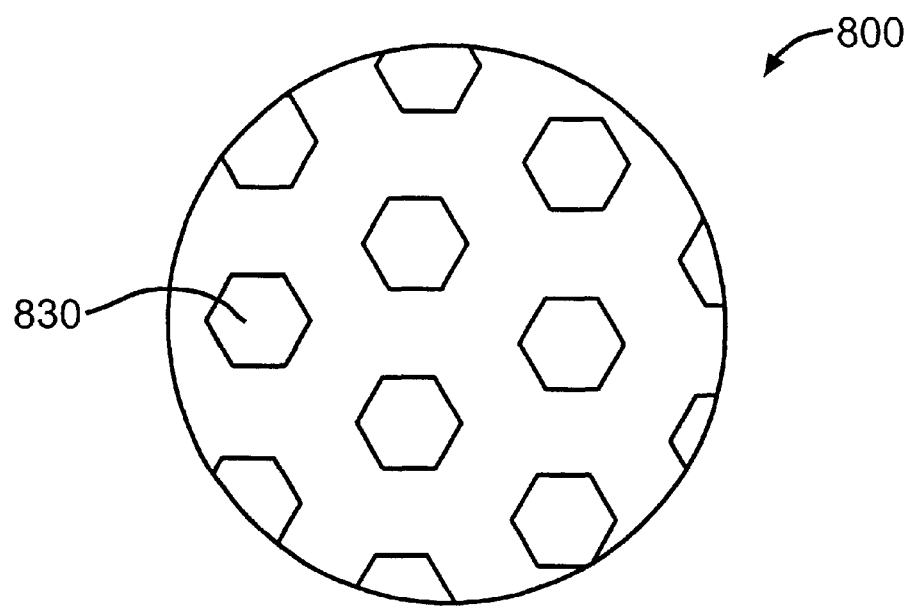

Referring now to FIGS. 20 and 20*a*, an alternative embodiment of an upper portion 804 of the cushion of this invention, indicated generally at 800, is shown. FIG. 20*a* is an enlarged plan view of a portion of the upper portion 804 illustrated in FIG. 20. The upper portion 804 of the cushion 800 has a top surface containing one or more nubs 830. The nubs 830 may be of any suitable height. However, in one preferred embodiment the nub height is 0.5 millimeters to 1.0 millimeter. As illustrated, the nubs 830 are hexagonal in shape, but it is to be understood that the nubs may be any shape and may be spaced in any configuration. Without excluding circular nubs from the scope of the invention, it is believed that having side walls of the nubs 830 extend at right angles from the upper surface of the upper portion 804 (as shown in FIG. 20) will provide a more non-slip surface, while the relatively soft material of the upper portion 804 will help keep the cushion 800 from irritating the finger of a user. The nubs 830 are spaced from about 0.5 millimeters to about 1.0 millimeters on center and the nubs are about 0.5 millimeters to about 0.10 millimeters in width. Spacing the nubs 830 apart creates an open pattern texture. It is believed that the open pattern of the spaced-apart nubs 830 will make the cushion 800 relatively easy to keep clean and allows the user to maintain accuracy with the cursor control stick.

Figure 21A:
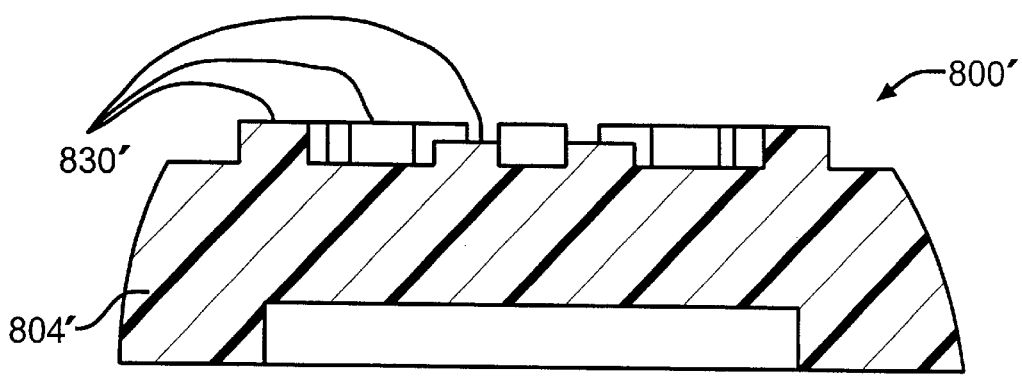
Figure 21:
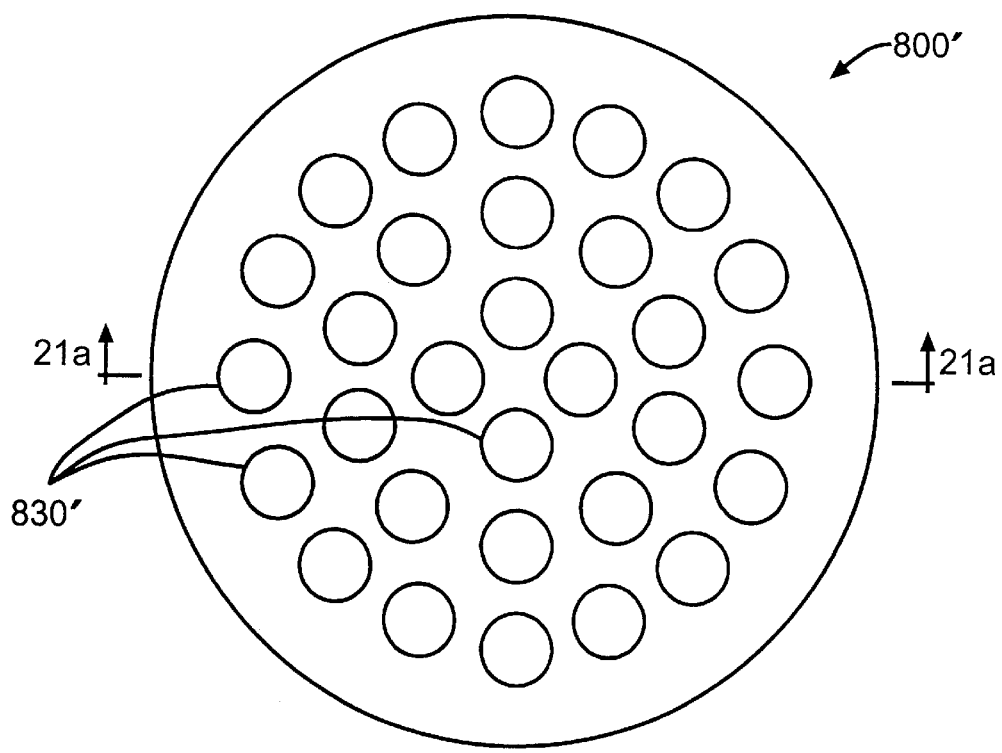
FIG. 21 is a cross sectional view of the cushioned cap illustrated in FIG. 18.

Referring now to FIGS. 21 and 21*a*, an alternative embodiment of an upper portion 804' of the cushion of this invention, indicated generally at 800', is shown. FIG. 21*a* is an enlarged plan view of a portion of the upper portion 804' illustrated in FIG. 21. The upper portion 804' of the cushion 800' has a top surface containing one or more nubs 830'. The nubs 830' may be of any suitable height and may be of different heights from one another. However, in one preferred embodiment the nub height is about 0.25 millimeters to about 1.0 millimeter. As illustrated, the nubs 830' are round in shape, but it is to be understood that the nubs may be any shape and may be spaced in any configuration. Without excluding rounded nubs from the scope of the invention, it is believed that having side walls of the nubs 830' extend at right angles from the upper surface of the upper portion 804' (as shown in FIG. 21) will provide a more non-slip surface, while the relatively soft material of the upper portion 804' will help keep the cushion 800' from irritating the finger of a user. The nubs 830' are spaced from about 0.25 millimeters to about 1.0 millimeters on center and the nubs are about 0.5 to about 1.0 millimeters in width. Spacing the nubs 830' apart creates an open pattern texture. It is believed that the open pattern of the spaced-apart nubs 830' will make the cushion 800' relatively easy to keep clean and allows the user to maintain accuracy with the cursor control stick.

Figure 22:
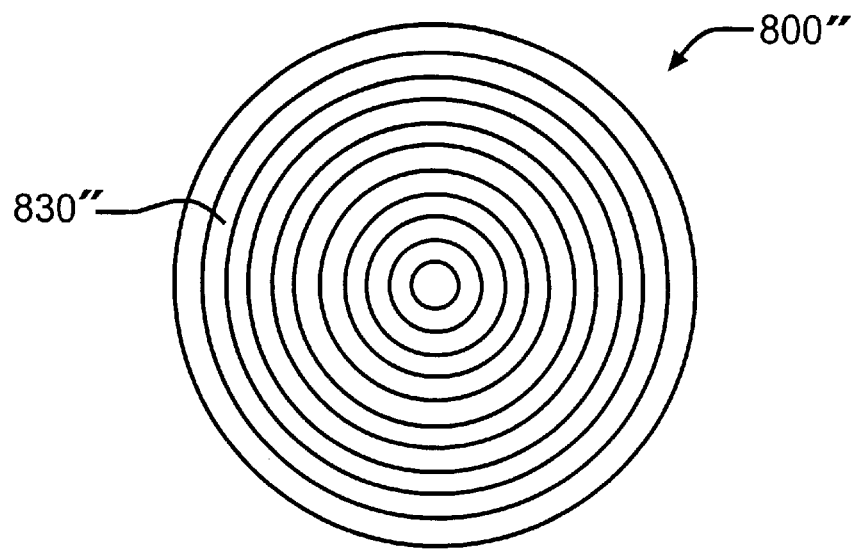
FIG. 22 is similar to FIG. 18, except showing an alternate embodiment of the textured surface.
Figure 23:
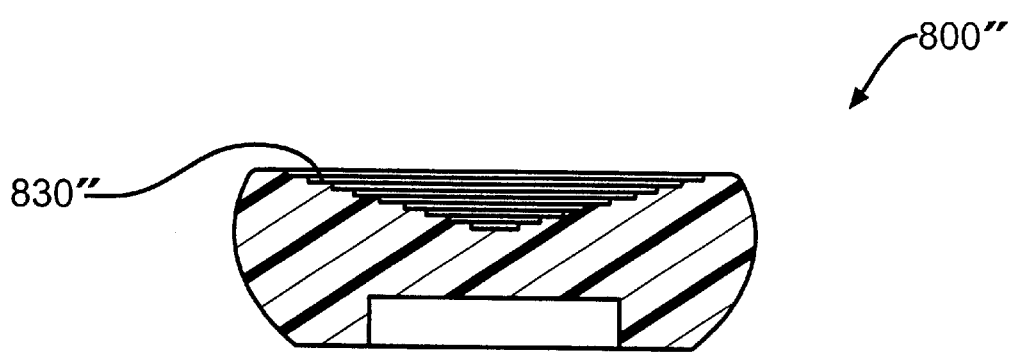
FIG. 23 is a cross sectional view of the cushioned cap illustrated in FIG. 22.
Figure 24:
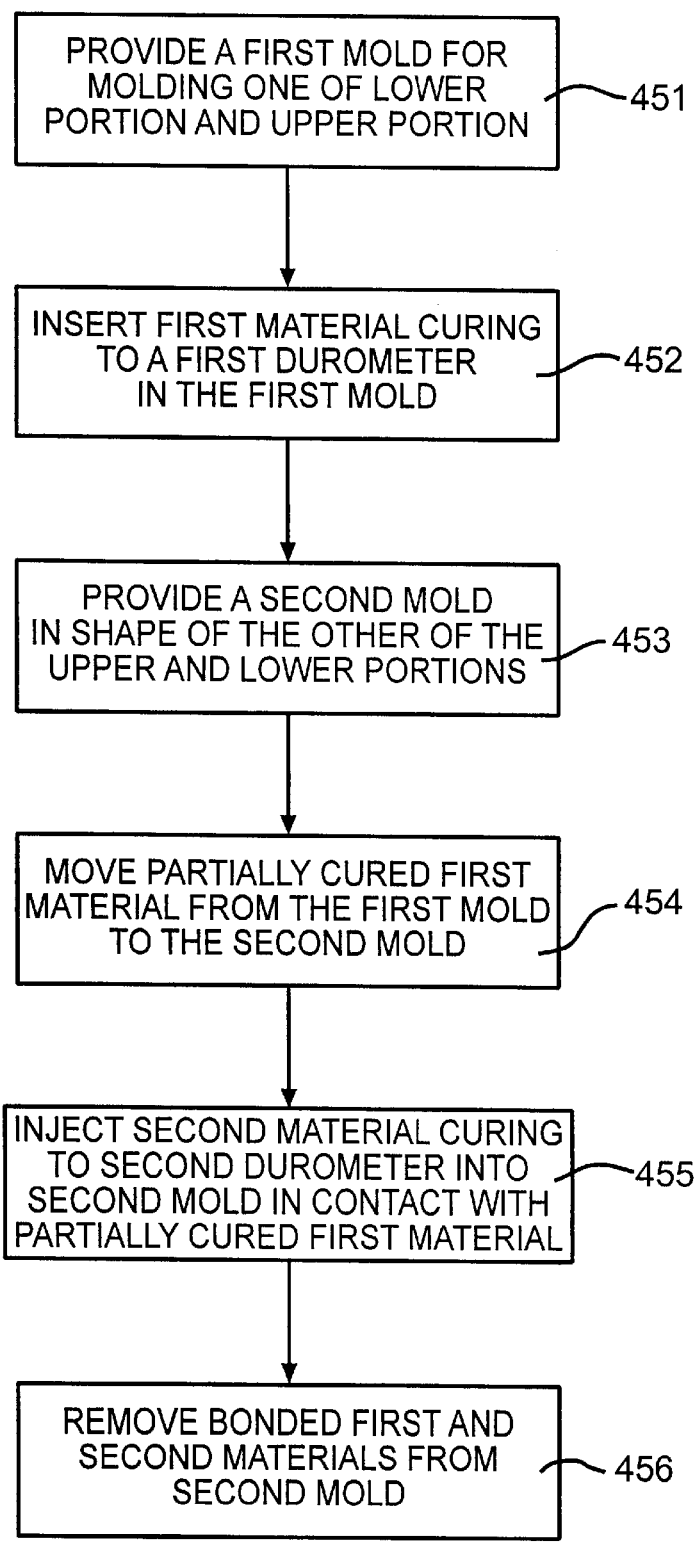
FIG. 24 is a flowchart illustrating a method of manufacturing a gel cushion in accordance with this disclosure.

Another alternate embodiment of an upper portion 804" of the cushion of this invention, indicated generally at 800", is shown in FIGS. 22 and 23. In this embodiment, the texture is provided in the form of concentric rings 830", each preferably having a rectangular cross-section.

Additionally, the upper portion 804" increases in thickness from the center of the upper portion 804" of the cushion 800" toward the circumferential periphery of the upper portion 804" of the cushion 800" as shown. The resulting upper portion of the cushion 800" is concave in shape, as is shown in FIG. 23. This concave shape may be considered another form of texture, and as illustrated, may be used in conjunction with other forms of texture, such as the concentric rings 830" (as shown in FIGS. 22, 23), or the nubs 830' (as shown in FIGS. 21, 21*a*), or the nubs 830 (as shown in FIGS. 20, 20*a*). Of course, concentric rings could be added to a flat or convex upper portion.

In summary, various aspects of this invention include:

A control stick with a contact surface which is relatively soft and nonirritating to the body tissue of a user.

A cushion for a control stick, the cushion being softer than the control stick.

A cushion for a control stick, the cushion being formed of a gel material softer than the control stick.

A control stick cushion, which can contact a display screen of a computer display, deform elastically, and not damage the display screen.

A cushion for a control stick, joystick, or similar device, which is soft and non-irritating to the body tissue of a user during extended periods of normal use.

A control stick cushion formed of two or more materials having different hardnesses.

A control stick cushion formed from a two-step injection process.

A control stick cushion formed from a two-step injection process, with an upper surface with a texture created by a mold with an abraded surface.

A control stick cushion having an upper portion of a relatively soft material, preferably having a Shore A durometer of about 3 to about 10; the upper surface of the upper portion may be provided with a surface texture.

A control stick cushion having an upper portion and a lower portion; the lower portion of a material relatively harder than the material of the upper portion, preferably having a Shore A durometer of about 55 to about 65.

A control stick cushion having a concave upper surface.

A control stick cushion surface texture, the pattern of which is an open pattern.

A control stick cushion surface texture, the pattern of which is shaped as spaced hexagonal nubs.

A control stick cushion surface texture, the pattern of which is shaped as concentric rings.

A control stick cushion surface texture, the sidewalls of which texture rises at approximately right angles to the surrounding upper surface.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A composite cushion for a cursor control stick, wherein said cushion has a first end formed of a first material having a first durometer and a second end formed of a second material having a second durometer, said first durometer being greater than said second durometer.

2. The cushion of claim 1, wherein said first material is selected from the group comprising at least one of silicone gels, thermoplastic rubber compounds, and thermoplastic elastomeric compounds.

3. The cushion of claim 1, wherein said second material is selected from the group comprising at least one of silicone gels, thermoplastic rubber compounds, and thermoplastic elastomeric compounds.

4. The cushion of claim 1, wherein said second material has a Shore A durometer of about 3 to about 10.

5. The cushion of claim 1, wherein said first material has a Shore A durometer of about 55 to about 65.

6. The cushion of claim 1, wherein said second material is elastic.

7. The cushion of claim 1, wherein said second end is flat and has a uniform thickness of the center portion of said second end.

8. The cushion of claim 1, wherein said second end has a depression therein that is suitable to receive a fingertip of a user.

9. The cushion of claim 1, wherein said second end decreases in thickness from the circumferential periphery of said second end to the center of said second end.

10. The cushion of claim 1, wherein said second end decreases in thickness from the center of said second end to the circumferential periphery of said second end.

11. The cushion of claim 1, wherein said first end of said cushion defines a pocket in said first end of said cushion, said pocket being sized to accommodate at least a portion of a computer cursor control stick therein.

12. The cushion of claim 11, wherein said pocket is a stepped recess, having a first recess and a second recess.

13. The cushion of claim 12, wherein said first recess has a diameter larger than the diameter of a cursor control stick.

14. The cushion of claim 12, wherein said second recess has a diameter smaller than the diameter of a cursor control stick.

15. The cushion of claim 12, wherein the walls surrounding said first recess are used to substantially align a cursor control stick for engagement with said second recess.

16. The cushion of claim 12, wherein said second recess allows said second end additional flexible depression.

17. The cushion of claim 11, wherein said pocket is a two-stepped recess, having a first recess, a second recess and a third recess.

18. The cushion of claim 17, wherein said first recess has a diameter larger than the diameter of a cursor control stick.

19. The cushion of claim 17, wherein the walls surrounding said first recess is used to substantially align a cursor control stick for engagement with said second recess.

20. The cushion of claim 17, wherein said second recess allows said second end additional flexible depression.

21. The cushion of claim 17, wherein said third recess allows said second end additional flexible depression.

22. The cushion of claim 1, wherein a portion of said second end is textured.

23. The cushion of claim 22, wherein said texture of said second end forms an open pattern texture.

24. The cushion of claim 23, wherein said second end is textured by the provision of at least one of a plurality of raised nubs and a plurality of raised ridges.

25. The cushion of claim 24, wherein each of said nubs extends substantially perpendicular to said second end.

26. The cushion of claim 24, wherein each of said nubs has a round cross-section.

27. The cushion of claim 24, wherein each of said nubs has a polygonal cross-section.

28. The cushion of claim 27, wherein each of said nubs has a hexagonal cross-section.

29. A composite cushion for a cursor control stick, wherein said cushion has a first end formed of a first material having a first durometer and a second end formed of a second material having a second durometer, said first durometer being greater than said second durometer, wherein said first end of said cushion defines a pocket in said first end of said cushion, said pocket being sized to accommodate at least a portion of a computer cursor control stick therein.

30. A composite cushion for a cursor control stick, wherein said cushion has a first end formed of a first material having a first durometer and a second end formed of a second material having a second durometer, said first durometer being greater than said second durometer, wherein said first material is selected from the group comprising at least one of silicone gels, thermoplastic rubber compounds, and thermoplastic elastomeric compounds.

31. A composite cushion for a cursor control stick, wherein said cushion has a first end formed of a first material having a first durometer and a second end formed of a second material having a second durometer, said first durometer being greater than said second durometer, wherein said second material is selected from the group comprising at least one of silicone gels, thermoplastic rubber compounds, and thermoplastic elastomeric compounds.

32. A composite cushion for a cursor control stick, wherein said cushion has a first end formed of a first material having a first durometer and a second end formed of a second material having a second durometer, said first durometer being greater than said second durometer, wherein a portion of said second end is textured.

33. A composite cushion for a cursor control stick, wherein said cushion has a first end formed of a first material having a first durometer and a second end formed of a second material having a second durometer, said first durometer being greater than said second durometer, wherein said second end is textured by the provision of at least one of a plurality of raised nubs and a plurality of raised ridges.

34. A composite cushion for a cursor control stick, wherein said cushion has a first end formed of a first material having a first durometer and a second end formed of a second material having a second durometer, said first durometer being greater than said second durometer, wherein said second end is textured by the provision of at least one of a plurality of raised nubs, each of said nubs has a circular cross-section.

35. A composite cushion for a cursor control stick, wherein said cushion has a first end formed of a first material having a first durometer and a second end formed of a second material having a second durometer, said first durometer being greater than said second durometer, wherein said second end is textured by the provision of at least one of a plurality of raised nubs, each of said nubs has a polygonal cross-section.

36. The cushion of claim 35, wherein each of said nubs has a hexagonal cross-section.

37. The cushion of claim 35, wherein each of said nubs has a rounded upper portion.

38. A composite cushion for a cursor control stick, wherein said cushion has a first end formed of a first material having a first durometer and a second end formed of a second material having a second durometer, said first durometer being greater than said second durometer, wherein said first end of said cushion defines a pocket in said first end of said cushion, said pocket being sized to accommodate at least a portion of a computer cursor control stick therein, wherein said first material has a Shore A durometer of about 3 to about 10 and is selected from the group comprising at least one of silicone gels, thermoplastic rubber compounds, and thermoplastic elastomeric compounds, wherein said second material has a Shore A durometer of about 55 to about 65 and is selected from the group comprising at least one of silicone gels, thermoplastic rubber compounds, and thermoplastic elastomeric compounds.

39. A method of manufacturing a cushion for a control stick, comprising the steps of:
 a. providing a first mold having an internal cavity;
 b. depositing a first material into said cavity of said first mold to form a first portion of the cushion and allowing said first material to partially cure;
 c. providing a second mold having an internal cavity;
 d. placing the first material into said cavity of said second mold;
 e. depositing a second material into said cavity of said second mold so that said second material come into contact with said first material while said first material is still only partially cured, said second material forming a second portion of the cushion; and
 f. fully curing said first material and said second material to form said cushion, wherein said first material has a first hardness and said second material has a second hardness which is softer than said first hardness.

40. The method of claim 39, wherein said first material is selected from the group comprising at least one of silicone gels, thermoplastic rubber compounds, and thermoplastic elastomeric compounds.

41. The method of claim 39, wherein said second material is selected from the group comprising at least one of silicone gels, thermoplastic rubber compounds, and thermoplastic elastomeric compounds.

42. The method of claim 39, wherein said first material has a Shore A durometer of about 3 to about 15.

43. The method of claim 39, wherein said second material has a Shore A durometer of about 55 to about 75.

44. The method of claim 39, wherein said second mold has a surface with texture.

45. The method of claim 44, wherein said texture is created by abrading said surface of said second mold.

46. The method of claim 44, wherein said texture on said surface of said second mold is created by an electrical discharge machine.

47. A cushion for a cursor control stick, said cushion comprising:
 a lower portion, said lower portion defining a recess for receiving at least a portion of a cursor control stick; and
 an upper portion, said upper portion including a generally radially outwardly extending flange formed thereon.

48. A cushion for a cursor control stick, said cushion comprising:
 a lower portion, said lower portion defining a recess for receiving at least a portion of a cursor control stick, a portion of said lower portion defining a first diameter; and
 an upper portion, said upper portion including a generally radially outwardly extending flange formed thereon, wherein a portion of said upper portion defines a second diameter that is larger than the first diameter.

49. The cushion of claim 47, wherein the upper portion and lower portion are each formed from a first material.

50. The cushion of claim 49, wherein the first material is selected from the group comprising at least one of silicone gels, thermoplastic rubber compounds, and thermoplastic elastomeric compounds.

51. A cushion for a cursor control stick, said cushion comprising:
 a lower portion, said lower portion defining a recess for receiving at least a portion of a cursor control stick and a portion of said lower portion defining a first diameter; and
 an upper portion, said upper portion including a radially outwardly extending flange formed thereon, wherein said upper portion includes an upper surface, said upper surface defining a second diameter that is larger than the first diameter.

52. A cushion for a cursor control stick, said cushion comprising:
 a lower portion, said lower portion defining a recess for receiving at least a portion of a cursor control stick; and
 an upper portion, said upper portion including a radially outwardly extending flange formed thereon, wherein said upper portion includes an upper surface, wherein at least a portion of said upper surface is generally one of convex, concave, and flat.

53. A cushion for a cursor control stick, said cushion comprising:
 a lower portion, said lower portion defining a recess for receiving at least a portion of a cursor control stick; and
 an upper portion, said upper portion including a radially outwardly extending flange formed thereon, wherein said upper portion includes an upper surface, wherein at least a portion of said upper surface is textured.

54. The cushion of claim 53, wherein said upper surface is one of convex, concave, and flat.

55. The cushion of claim 53, wherein at least a portion of said upper surface is textured with an open pattern texture.

56. The cushion of claim 53, wherein at least a portion of said upper surface is textured with a ridge extending around the periphery of said upper surface.

57. The cushion of claim 53, wherein a first portion of said upper surface is textured with a ridge extending around the periphery of said upper surface and a second portion of said upper surface is textured.

58. The cushion of claim 53, wherein at least a portion of said upper surface is textured with at least one of a raised nub and a raised ridge.

59. The cushion of claim 53, wherein said upper surface defines at least one of a raised nub and a raised ridge extending substantially perpendicular to said upper surface.

60. A cushion for a cursor control stick, said cushion comprising:
 a lower portion, said lower portion defining a recess for receiving at least a portion of a cursor control stick and having a generally cylindrical outer surface defining a first diameter; and
 an upper portion, said upper portion including a radially outwardly extending flange formed thereon, wherein said upper portion including an upper surface, said upper surface having a second diameter that is larger than the first diameter, said upper surface being concave, a central portion of said upper surface having a textured surface, said upper face further including a ridge around the periphery of said upper surface.

61. A cushion for a cursor control stick, said cushion comprising:
 a lower portion, said lower portion defining a recess for receiving at least a portion of a cursor control stick and having a generally cylindrical outer surface defining a first diameter; and an upper portion and said upper portion including a radially outwardly extending flange formed thereon, wherein said upper portion including an upper surface, said upper surface has a second diameter that is larger than the first diameter, said upper surface being convex, a portion of said upper surface including a plurality of nubs having a circular cross section.

62. A cushion for a cursor control stick, said cushion comprising:

a generally frustoconical upper portion, a ridge extending around the periphery of said upper portion; and a lower portion, said lower portion defining a recess for receiving at least a portion of a cursor control stick.

63. The cushion of claim 62, wherein said upper portion and said lower portion are integrally formed.

64. A cushion for a cursor control stick, said cushion comprising:

an upper portion, a portion of said upper portion being generally frustoconical; and a generally cylindrical lower portion, said lower portion defining a recess for receiving at least a portion of a cursor control stick.

65. The cushion of claim 64, wherein said upper portion and said lower portion are integrally formed.

66. A cushion for a cursor control stick, said cushion comprising:

an upper surface, at least a portion of said upper surface is textured with an open pattern texture;

a generally frustoconical portion; and a lower portion, said lower portion defining a recess for receiving at least a portion of a cursor control stick.

67. The cushion of claim 66, wherein said open pattern texture includes at least one nub.

68. A generally mushroom-shaped cushion for a cursor control stick, said cushion comprising:

a generally cylindrical lower portion, said lower portion defining a recess for receiving at least a portion of a cursor control stick; and an enlarged upper portion.

69. A cushion for a cursor control stick, said cushion comprising:

a generally cylindrical lower portion, said lower portion defining a recess for receiving at least a portion of a cursor control stick; and an upper portion, said upper portion including a radially outwardly extending flange formed thereon.

70. A cushion for a cursor control stick, said cushion comprising:

an upper portion; and a lower portion, said lower portion defining a recess for receiving at least a portion of a cursor control stick, said cushion having an open pattern texture formed thereon.

71. The cushion of claim 70, wherein said open pattern texture is formed on at least a portion of said upper portion.

72. The cushion of claim 70, wherein said open pattern texture includes at least one nub.

73. The cushion of claim 70, wherein said cushion has at least one ridge formed thereon.

74. The cushion of claim 70, wherein said open pattern texture includes at least one ridge and at least one nub.

75. The cushion of claim 70, wherein said open pattern texture is formed on a generally convex surface of the cushion.

76. The cushion of claim 70, wherein said open pattern texture is formed on a generally concave surface of the cushion.

77. The cushion of claim 70, wherein said open pattern texture is formed on a generally flat surface of the cushion.

78. A cushion for a cursor control stick, said cushion comprising:

a lower portion, said lower portion defining a recess for receiving at least a portion of a cursor control stick; and an upper portion, said upper portion including a radially outwardly extending flange formed thereon, at least a portion of said upper portion being generally frustoconical.

79. A cushion for a cursor control stick, said cushion comprising:

a lower portion, said lower portion defining a recess for receiving at least a portion of a cursor control stick; and an upper portion, said upper portion including a radially outwardly extending flange formed thereon, said upper portion having an open pattern texture formed thereon.

80. The cushion of claim 79, wherein said open pattern texture includes at least one nub.

81. The cushion of claim 79, wherein said open pattern texture includes at least one ridge.

82. A cushion for a cursor control stick, said cushion comprising:

a lower portion, said lower portion defining a recess for receiving at least a portion of a cursor control stick and defining a first diameter; and an upper portion, at least a portion of said upper portion having an open pattern texture formed thereon, at least a portion of said upper portion defining a second diameter that is larger than the first diameter.

83. The cushion of claim 82, wherein said open pattern texture includes at least one nub.

84. The cushion of claim 82, wherein said open pattern texture includes at least one ridge.

85. A cushion for a cursor control stick, said cushion comprising:

a lower portion, said lower portion defining a recess for receiving at least a portion of a cursor control stick and defining a first diameter; and an upper portion having an upper surface, at least a portion of said upper portion having an open pattern texture formed thereon, an upper surface defining a second diameter that is larger than the first diameter.

86. A cushion for a cursor control stick, said cushion comprising:

a lower portion, said lower portion defining a recess for receiving at least a portion of a cursor control stick; and an upper portion, said upper portion having an upper surface, said upper surface being generally concave.

87. The cushion of claim 86, wherein at least a portion of said upper portion is frustoconical.

88. The cushion of claim 86, wherein said lower portion defines a first diameter, at least a portion of said upper portion defines a second diameter that is larger than the first diameter.

89. The cushion of claim 86, wherein said lower portion defines a first diameter, said upper surface defines a second diameter that is larger than the first diameter.

90. A cushion for a cursor control stick, said cushion comprising:

a generally cylindrical lower portion, said lower portion defining a recess for receiving at least a portion of a cursor control stick and defining a first diameter; and an upper portion, at least a portion of said upper portion defining a second diameter that is larger than the first diameter.

91. A cushion for a cursor control stick, said cushion comprising:

a lower portion, said lower portion defining a recess for receiving at least a portion of a cursor control stick; and an upper portion, said upper portion including an upper surface, at least a portion of said upper surface having a texture formed thereon, at least a portion of said upper surface including a plurality of nubs.

92. A cushion for a cursor control stick, said cushion comprising:

a lower portion, said lower portion defining a recess for receiving at least a portion of a cursor control stick; and an upper portion, said upper portion including an upper surface, at least a portion of said upper surface having a texture formed thereon, at least a portion of said upper surface including at least one ridge.

93. A cushion for a cursor control stick, said cushion comprising:

a lower portion, said lower portion defining a recess for receiving at least a portion of a cursor control stick; and an upper portion, said upper portion including an upper surface, at least a portion of said upper surface having texture formed thereon, said upper surface being concave.

94. A cushion for a cursor control stick, said cushion comprising:

a lower portion, said lower portion defining a recess for receiving at least a portion of a cursor control stick; and an upper portion, said upper portion including an upper surface, at least a portion of said upper surface having texture formed thereon, said upper surface being flat.

95. A cushion for a cursor control stick, said cushion comprising:

a lower portion, said lower portion defining a recess for receiving at least a portion of a cursor control stick; and an upper portion, said upper portion including an upper surface, at least a portion of said upper surface having a plurality of nubs formed thereon.

96. The cushion of claim 95, wherein said upper surface is generally convex.

97. The cushion of claim 95, wherein said upper surface is generally concave.

98. The cushion of claim 95, wherein said upper surface is generally flat.

99. A cushion for a cursor control stick, said cushion comprising:

a lower portion, said lower portion defining a recess for receiving at least a portion of a cursor control stick; and an upper portion, said upper portion including an upper surface, at least a portion of said upper surface having at least one ridge formed thereon.

100. The cushion of claim 99, wherein said upper surface is generally convex.

101. The cushion of claim 99, wherein said upper surface is generally concave.

102. The cushion of claim 99, wherein said upper surface is generally flat.

103. A cushion for a cursor control stick, said cushion comprising:

a lower portion, said lower portion defining a recess for receiving at least a portion of a cursor control stick and having a generally cylindrical outer surface defining a first diameter; and an upper portion, a portion of said upper portion having a second diameter that is larger than the first diameter.

* * * * *